US007809146B2

(12) United States Patent
Hiroe et al.

(10) Patent No.: US 7,809,146 B2
(45) Date of Patent: Oct. 5, 2010

(54) AUDIO SIGNAL SEPARATION DEVICE AND METHOD THEREOF

(75) Inventors: Atsuo Hiroe, Kanagawa (JP); Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 1030 days.

(21) Appl. No.: 11/421,619

(22) Filed: Jun. 1, 2006

(65) Prior Publication Data

US 2006/0277035 A1 Dec. 7, 2006

(30) Foreign Application Priority Data

Jun. 3, 2005 (JP) ........................... P2005-164463

(51) Int. Cl.
*H04B 15/00* (2006.01)
*G10L 19/02* (2006.01)

(52) U.S. Cl. ...................................... 381/94.3; 704/203

(58) Field of Classification Search ................ 381/94.1, 381/94.2, 94.3, 98; 704/200, 203, 205, 206
See application file for complete search history.

(56) References Cited

U.S. PATENT DOCUMENTS

| | | | | |
|---|---|---|---|---|
| 7,647,209 | B2 * | 1/2010 | Sawada et al. | 702/190 |
| 2008/0208570 | A1 * | 8/2008 | Nam | 704/201 |
| 2009/0222262 | A1 * | 9/2009 | Kim et al. | 704/231 |

FOREIGN PATENT DOCUMENTS

| | | |
|---|---|---|
| JP | 2004-126198 | 4/2004 |
| JP | 2004-145172 | 5/2004 |

OTHER PUBLICATIONS

Sawada et al, "A Robust and Precise Method for Solving the Permutation Problem of Frequency-Domain Blind Source Separation", IEEE Transactions on Speech and Audio Processing, vol. 12, No. 5, Sep. 2004, pp. 530-538.*

* cited by examiner

*Primary Examiner*—Curtis Kuntz
*Assistant Examiner*—Hai Phan
(74) *Attorney, Agent, or Firm*—Sonnenschein Nath & Rosenthal LLP

(57) ABSTRACT

Problems of permutation can be solved with high accuracy without utilizing knowledge about original signals or information concerning positions of microphones and the like when each one of plural signals mixed in an audio signal is separated using independent component analysis. A short-time Fourier transformation section generates spectrograms of observation signals from observation signals in time domain. A signal separation section separates the spectrograms of the observation signals into spectrograms of respective signals, to generate spectrograms of separate signals. A permutation problem solution section calculates a scale corresponding to the degree of permutation, e.g., a Kullback-Leiblar information amount calculated by use of a multidimensional probability density function or multidimensional kurtosis, from substantial whole of the spectrograms of the separate signals. Based on the scale, signals at each of frequencies bin of the spectrograms of the separate signals are exchanged between channels, to solve the permutation problem.

5 Claims, 38 Drawing Sheets

$$f(x) = \frac{1}{\cosh x}, N = 2$$

$$f(x) = \exp(-|x|), N = 2$$

AUDIO SIGNAL SEPARATION DEVICE AND METHOD THEREOF

CROSS REFERENCES TO RELATED APPLICATIONS

The present invention contains subject matter related to Japanese Patent Application JP 2005-164463 filed in the Japanese Patent Office on Jun. 3, 2005,the entire contents of which being incorporated herein by reference.

BACKGROUND OF THE INVENTION

1. Field of the Invention

The present invention relates to an audio signal separation device and a method thereof, which separate plural signals mixed in an audio signal, from one another, by independent component analysis (ICA).

2. Description of the Related Art

In the field of signal processing, attention has been paid to a method of independent component analysis in which original signals are separated and restored when plural original signals are linearly mixed up by an unknown coefficient. If this independent component analysis is applied to audio signals, for example, voices simultaneously spoken by plural speakers can be observed by plural microphones, and the observed voices can then be separated for respective speakers or into noise and voices.

Referring to FIG. 1, a description will now be made of a case of separating respective signals from an audio signal in which plural signals are mixed up, by use of the independent component analysis in a time-frequency domain. The independent component analysis in a time-frequency domain is a method in which signals observed by plural microphones are transformed into signals in a time-frequency domain (spectrograms) by short-time Fourier transformation, and separation is conducted in the time-frequency domain (see Non-Patent Document 1:"Guide/independent Component Analysis" written by Noboru Murata, Tokyo Denki University Press).

Suppose that there are n original signals $s_1$ to $s_n$ which are generated by n sound sources and are independent from one another and that a vector with these signals as elements thereof. Observation signals observed by microphones each are a mixture of the plural original signals. Suppose that $x_1$ to $x_n$ are signals observed by n microphones and x is a vector with these observation signals as elements thereof. FIG. 2A shows an example of an observation signal x where the number n of microphones is two, i.e., the number of channels is two. Next, short-time Fourier transformation is performed on the observation signal x to obtain an observation signal X in a time-frequency domain. Where elements of X are $X_k(\omega, t)$, $X_k(\omega, t)$ are complex numbers. A graph expressing absolute values of $|X_k(\omega, t)|$ of $X_k(\omega, t)$ by color shading is called a spectrogram. FIG. 2B shows an example of the spectrogram of the observation signal X. In this figure, t indicates the frame number ($1 \leqq t \leqq T$), and ω indicates the number of frequencies bin ($1 \leqq \omega \leqq M$). Subsequently, each frequency bin of the signal X is multiplied by a separation matrix W(ω) to obtain a separate signal Y'. FIG. 2C shows an example of a spectrogram of a separate signal Y'.

According to the independent component analysis in a time-frequency domain as described above, signal separation processing is performed for each frequency bin. No consideration is taken into the relationship between the frequencies bin one another. Therefore, separation destinations are often inconsistent although the separation is complete successfully.

The inconsistent separation destinations appear, for example, as a phenomenon that a signal caused by $s_1$ appears as $Y_1$ where ω=1 while a signal caused by $s_2$ appears as $Y_1$ where ω=2. This phenomenon is also called permutation.

The problem of this permutation is solved by postprocessing of exchanging signals with one another for each frequency bin, to rearrange consistently the separation destinations. FIG. 2D shows an example of a spectrogram of a separate signal Y which has solved the problem of permutation. Finally, the separate signal Y is subjected to inverse Fourier transformation, to obtain a separate signal Y in time domain as shown in FIG. 2E.

SUMMARY OF THE INVENTION

To solve the problem of permutation as described above, exchange is carried out in postprocessing. In the postprocessing, a spectrogram as shown in FIG. 2C is prepared firstly by separation for each frequency bin. Exchange of separate signals between channels is then carried out according to some reference, thereby to obtain another spectrogram as shown in FIG. 2D. The reference for exchange may utilize (a) similarity between envelopes (see the Non-Pat. Document 1 mentioned previously), (b) estimated sound source directions (see Pat Document 1:Jpn. Pat. Appln. Laid-Open Publication No. 2004-145172), (c) a combination of the foregoing items (a) and (b), or (d) a neutral network (see Pat. Document 2:Jpn. Pat. Appln. Laid-Open Publication No. 2004-126198).

However, as for the item (a) described above, difference between envelopes is unclear depending on the frequency bin, in some cases. Such cases may cause wrong exchange of signals. Once wrong exchange takes place, separation destinations are mistaken for each subsequent frequency bin. As for the item (b), there is a problem of accuracy in estimating directions, and besides, information concerning positions and directions of microphones and intervals therebetween are necessary. As for the item (c) combining both of the items (a) and (b), position information concerning microphones are necessary like the foregoing item (b) although exchange accuracy improves. The item (d) has to construct a neutral network in advance and some knowledge about original signals is necessary.

Thus, in the past, no method can solve the problem of permutation with good accuracy without utilizing knowledge about original signals or utilizing information concerning positions of microphones and the like.

The present invention has been made in view of the situation as described above. It is desirable to provide an audio separation device and a method thereof which are capable of solving the problem of permutation with high accuracy without utilizing knowledge about original signals or information concerning positions of microphones and the like, when each one of plural signals mixed in an audio signal is separated by use of independent component analysis.

According to an embodiment of the present invention, there is provided an audio signal separation device which generates separate signals by separating each one of plural signals mixed up in a plural channels of observation signals in time domain from the observation signals by use of independent component analysis, the audio signal separation device including: a transformation means for transforming the observation signals in time domain into time-frequency domain, to generate a spectrogram of the observation signals; a separation means for generating spectrograms of the separate signals from the spectrogram of the observation signals; and a permutation problem solution means for solving a permutation problem in the spectrograms of the separate signals, wherein the permutation problem solution means calculates a scale corresponding to a degree of permutation, from substantial whole of the spectrograms of the separate signals, and exchanges signals at each of frequencies bin of the spectrograms of the separate signals between channels according to the calculated scale, to solve the permutation problem.

Also according to an embodiment of the present invention, there is provided an audio signal separation method for generating separate signals by separating each one of plural signals mixed up in plural channels of observation signals in time domain from the observation signals by use of independent component analysis, the audio signal separation method including: a transformation step of transforming the observation signals in time domain into time-frequency domain, to generate a spectrogram of the observation signals; a separation step of generating spectrograms of the separate signals from the spectrograms of the observation signals; and a permutation problem solution step of solving a permutation problem in the spectrograms of the separate signals, wherein in the permutation problem solution step, a scale corresponding to a degree of permutation is calculated from substantial whole of the spectrograms of the separate signals, and signals at each of frequencies bin of the spectrograms of the separate signals are exchanged between channels according to the calculated scale, to solve the permutation problem.

According to the audio signal separation device and the method thereof, the problem of permutation can be solved with high accuracy without utilizing knowledge about original signals or information concerning positions of microphones and the like when each one of plural signals mixed in an audio signal is separated by use of independent component analysis.

DETAILED DESCRIPTION OF THE PREFERRED EMBODIMENTS

An embodiment to which the present invention is applied will now be described specifically with reference to the drawings. In this embodiment, the present invention is applied to an audio signal separation device which separates each signal of plural signals mixed in an audio signal from the audio signal by use of independent component analysis. Particularly in the audio signal separation device according to the present embodiment, as a scale to measure the degree of permutation, a Kullback-Leiblar information amount (hereinafter referred to as a "KL information amount") calculated by use of a multidimensional probability density function is calculated or multidimensional kurtosis is calculated from the all spectrograms (or substantially all spectrogram). For each frequency bin, signals are exchanged so as to minimize the degree of permutation.

Figure 1:
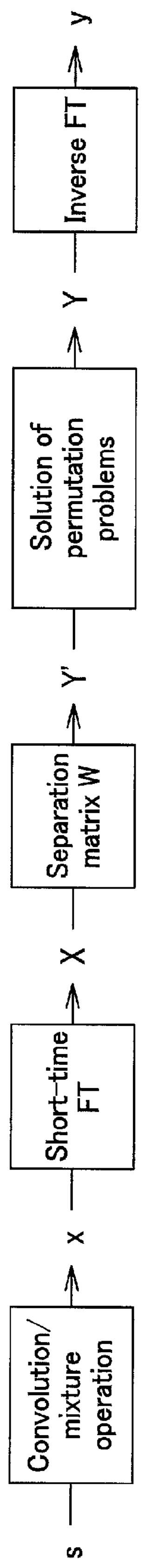
FIG. 1 is a chart explaining outline of independent component analysis in a time-frequency domain employed in the past.
Figures 2A, 2B, 2C, 2D, 2E:
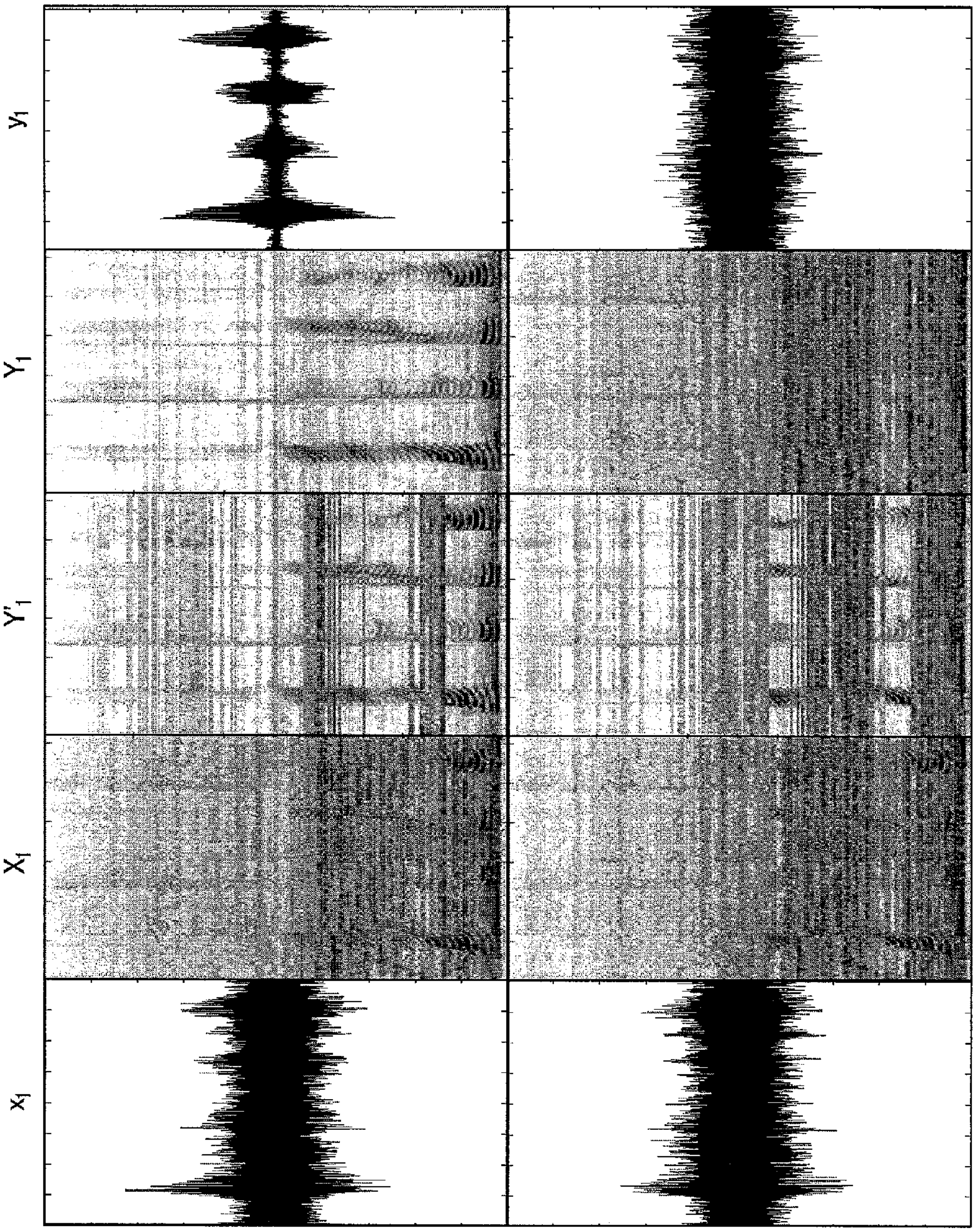
FIGS. 2A to 2E show observation signals and spectrograms thereof, and separate signals, spectrograms thereof, and other spectrograms thereof after solving the permutation problem.
Figure 3:
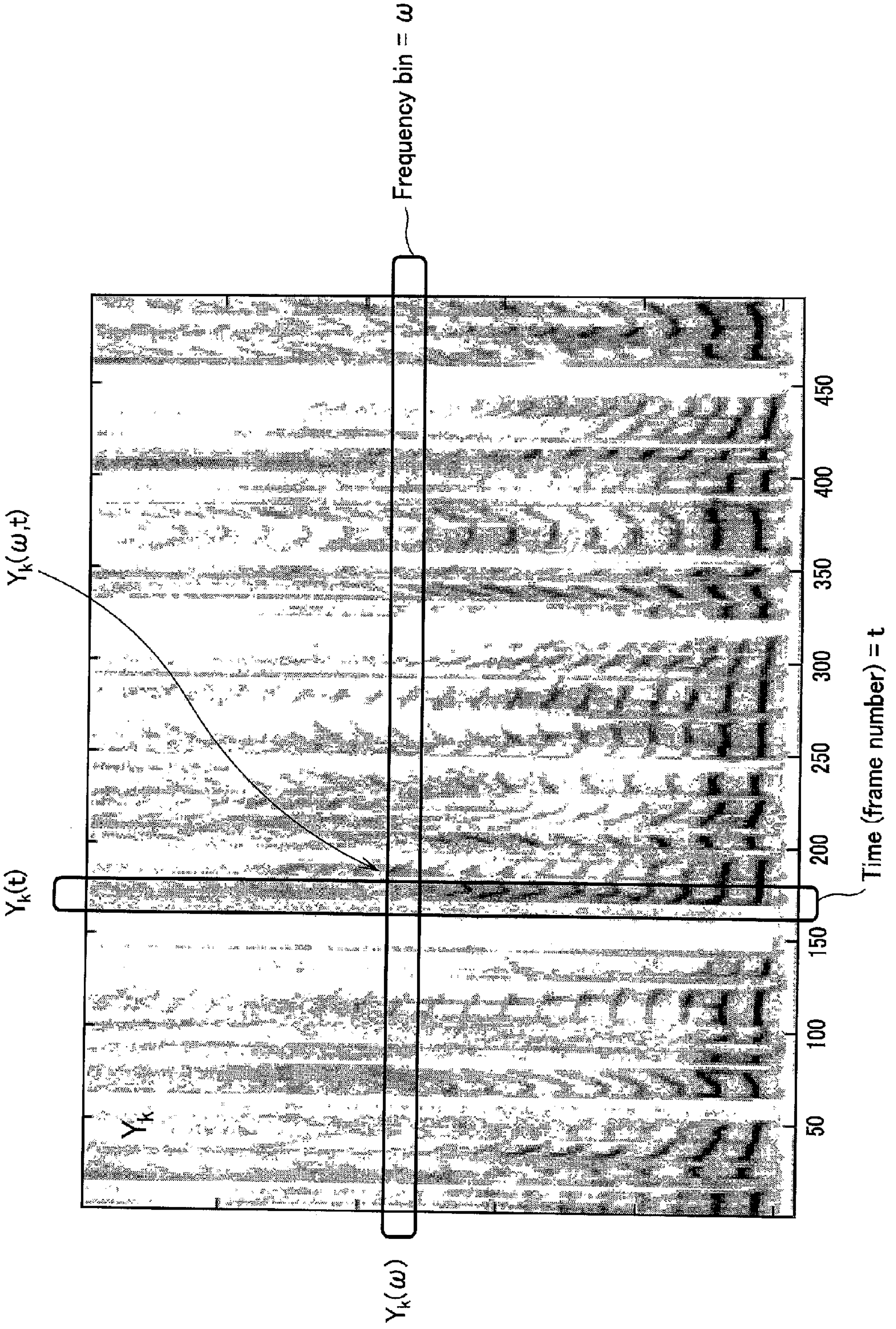
FIG. 3 shows an example of a spectrogram according to the present embodiment.

FIG. 3 shows examples of spectrograms according to the present embodiment. FIG. 3 shows a spectrogram $Y_k$ of a channel k($1 \leqq k \leqq n$). In the present description, a vector cut from a part of the spectrogram $Y_k$ at a frame number t($1 \leqq t \leqq T$) is referred to as a vector $Y_k(t)$ and a vector cut from such a part of the spectrogram $Y_k$ that is designated at a frequency bin number ω($1 \leqq \omega \leqq M$) is referred to as a vector $Y_k(\omega)$. Elements of the spectrogram $Y_k$ each are expressed as $Y_k(\omega, t)$. A vector having $Y_1(\omega)$ to $Y_n(\omega)$ as its own elements is referred to as a vector $Y(\omega)$. A vector having $Y_1$ to $Y_n$ as its own elements is referred to as a vector Y. These vectors Y, $Y(\omega)$, $Y_k(t)$, and $Y_k(\omega)$ are expressed bellow by the expressions (1) to (4).

$$Y = \begin{bmatrix} Y_1 \\ \vdots \\ Y_n \end{bmatrix} \quad (1)$$

$$Y(\omega) \begin{bmatrix} Y_1(\omega) \\ \vdots \\ Y_n(\omega) \end{bmatrix} \quad (2)$$

$$Y_k(t) = \begin{bmatrix} Y_k(1, t) \\ \vdots \\ Y_k(M, t) \end{bmatrix} \quad (3)$$

$$Y_k(\omega) = [\, Y_k(\omega, 1) \ \cdots \ Y_k(\omega, T) \,] \quad (4)$$

In the following, the point to be described first will be that the KL information amount calculated by use of a multidimensional probability density function and the multidimensional kurtosis can be utilized as scales to measure the degree of permutation. Specific configuration of the audio signal separation device according to the present embodiment will be described next.

(KL Information Amount Calculated by use of a Multidimensional Probability Density Function)

Figure 4:
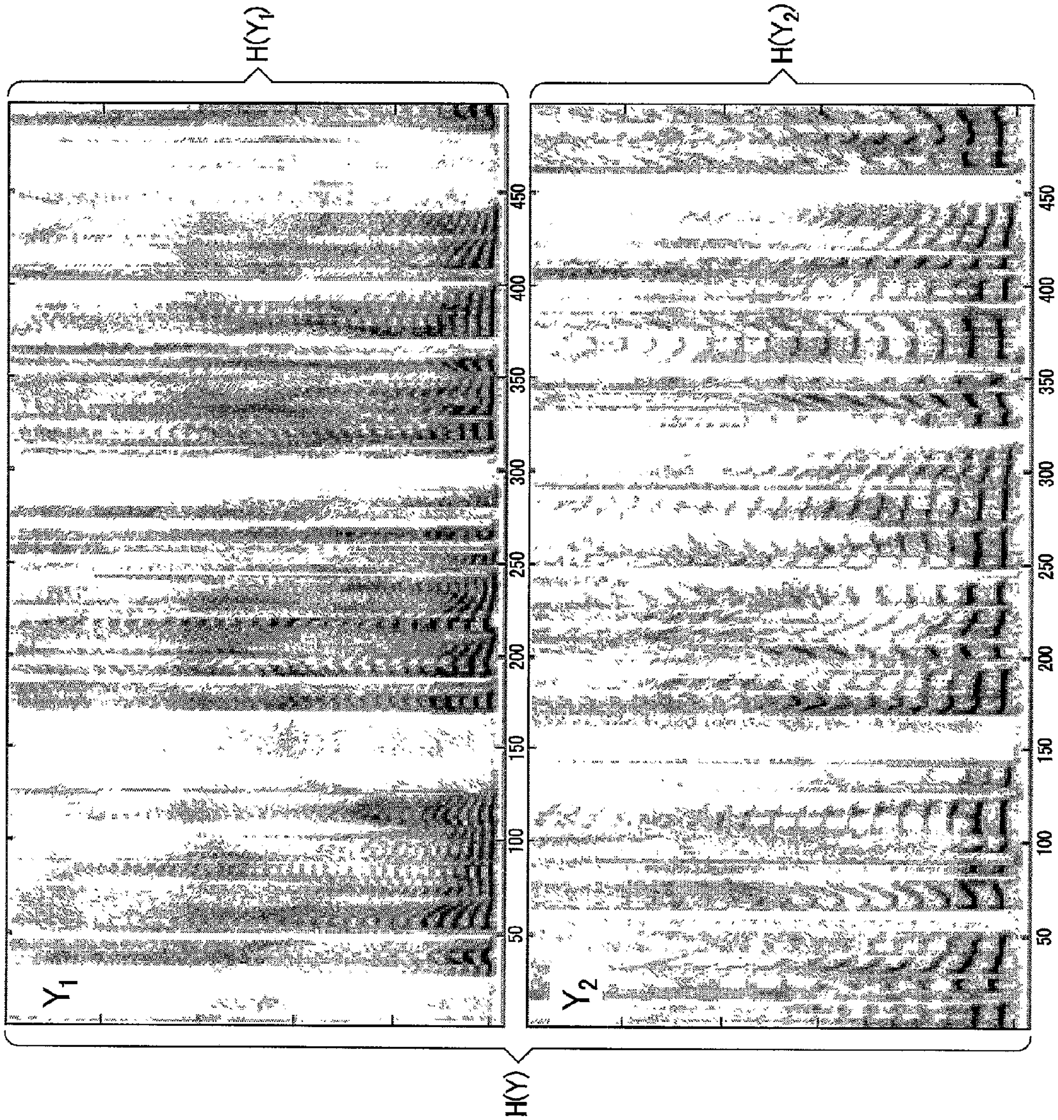
FIG. 4 shows a relationship between entropy H(Yk) of each channel and simultaneous entropy H(Y) of all channels where the number of channels=2 is given.

The KL information amount is a scale expressing independence between plural signals and is defined by the expression (5) below. In the expression (5), $H(Y_k)$ is entropy calculated from a spectrogram $Y_k$ of a channel k and H(Y) is simultaneous entropy calculated from spectrograms Y of all channels. Where the number of channels=2,the relationship between $H(Y_k)$ and H(Y) will be shown in FIG. 4.

$$I(Y) = \sum_{k=1}^{n} H(Y_k) - H(Y) \quad (5)$$

$$= \sum_{k=1}^{n} E_t[-\log P_{Yk}(Y_k(t))] - \log|det(P)| - H(Y') \quad (6)$$

$$= \sum_{k=1}^{n} E_t[-\log P_{Yk}(Y_k(t))] - const \quad (7)$$

Since the KL information amount defined by the expression (5) is calculated from the all spectrograms, the value of the KL information amount varies depending on whether permutation takes place in spectrograms. This will be described in more details below.

Suppose that a spectrogram in which permutation takes place immediately after separation is Y' and another spectrogram after permutation of the problem is solved is Y. A matrix expressing an operation of solving the permutation of the problem (i.e., an operation of exchanging signals between channels of the same frequency bin) is expressed as P. Y=PY' is derived herefrom. Hence, the expression (5) described above can be solved into the expression (6). The first term of the expression (6) is based on an equation defining entropy. The second and third terms thereof are based on the relationship of H(Y)=Log|det(P)|+H(Y') derived from Y=PY'. Since the matrix P is simply a replacement of rows in a unit matrix, det(P)=±1 is given. H(Y') can be regarded as a constant when solving the problem of permutation. Therefore, the expression (6) described above can be solved into the expression (7). The size of the KL information amount is determined by the total sum of entropies $H(Y_k)$ of all channels and does not depend on the simultaneous entropy H(Y) of all channels.

To obtain the entropy $H(Y_k)$ of a channel k, a vector $Y_k(t)$ obtained by cutting a part designated at a frame number t from a spectrogram $Y_k$ is substituted into $P_{Yk}(\ )$ as a probability density function (PDF) of $Y_k$, to obtain event probability of the vector. $H(Y_k)$ is calculated by averaging a minus logarithm of the event probability by the total time. Et[ ] expresses an average in the time direction.

When $Y_k(t)$ is substituted into $P_{Yk}(\ )$ to obtain the event probability, all elements of $Y_k(t)$ do not have to be used. For example, a power D(ω) per frequency bin (per ω) may be calculated by the following expression (8), and only those elements that correspond to L frequencies bin having higher powers may be used.

$$D(\omega)=\sum_{k=1}^{n}\sum_{t=1}^{T}|Y_k(\omega,t)|^2 \tag{8}$$

There is a certain relationship between the size of the KL information amount and the degree of permutation. Depending on setting of the probability density function $P_{Yk}(\ )$, a case of no permutation taking place can be set as a maximum or minimum value of the KL information amount.

An example of the probability density function of the spectrogram $Y_k$ will be defined by the expression (9) below. That is, an L-N norm of $Y_k(t)$ substituted into an arbitrary nonnegative function f( ) taking a scalar value as an argument is used as the probability density function. Note that the L-N norm is obtained by summing up n-th powers of absolutes of vector elements and by finally calculating an n-th root thereof, as expressed by the expression (10) below. In the expression (9), h is a constant by which each argument of $P_{Yk}(Y_k(t))$ integrated within a range of $-\infty$ to $+\infty$ is adjusted to 1,or in other words, the total sum of the event probabilities is adjusted to 1. However, in order to solve the problem of permutation, only the size of the KL information amount is important, and therefore, h can be any value as long as the value is positive. In the following, h=1 is given.

$$P_{Yk}(Y_k(t))=hf(\|Y_k(t)\|_N) \tag{9}$$

$$\|Y_k(t)\|_N=\left(\sum_{\omega=1}^{M}|Y_k(\omega,t)|^N\right)^{\frac{1}{N}} \tag{10}$$

The function f( ) in the above expression (9) can take various functions. An example of f( ) and $\log P_{Yk}(Y_k(t))$ thereof will be expressed by the following expressions (11) to (20). $P_{Yk}(Y_k(t))$ using $f(x)=1/|x|^m$ in the expression (15) does not match the characteristics of the probability density function because integration value thereof diverges. However, $P_{Yk}(Y_k(t))$ using $f(x)=1/|x|^m$ is cited as an example of the probability density function because entropy thereof can be calculated.

$$f(x)=\frac{1}{\cosh^l(Kx^m)} \tag{11}$$

$$\log P_{Yk}(Y_k(t))=-l\log\cosh\left(K\left(\sum_{\omega=1}^{M}|Y_k(\omega,t)|^N\right)^{\frac{m}{N}}\right) \tag{12}$$

$$f(x)=\exp(-K|x|^m) \tag{13}$$

$$\log P_{Yk}(Y_k(t))=-K\left(\sum_{\omega=1}^{M}|Y_k(\omega,t)|^N\right)^{\frac{m}{N}} \tag{14}$$

$$f(x)=\frac{1}{|x|^m} \tag{15}$$

$$\log P_{Yk}(Y_k(t))=-\frac{m}{N}\log\left(\sum_{\omega=1}^{M}|Y_k(\omega,t)|^N\right) \tag{16}$$

$$f(x)=\exp(-\tanh(Kx^m)) \tag{17}$$

-continued $$\log P_{Yk}(Y_k(t))=-\tanh\left(K\left(\sum_{\omega=1}^{M}|Y_k(\omega,t)|^N\right)^{\frac{m}{N}}\right) \tag{18}$$

$$f(x)=\exp(-\cosh(Kx^m)) \tag{19}$$

$$\log P_{Yk}(Y_k(t))=-\cosh\left(K\left(\sum_{\omega=1}^{M}|Y_k(\omega,t)|^N\right)^{\frac{m}{N}}\right) \tag{20}$$

Hereinafter, an experiment which has proved that the KL information amount is maximized or minimized only when no permutation takes place. In this experiment, permutation was artificially caused in two spectrograms which had not involved permutation. The relationship between the degree of permutation and the KL information amount was plotted to confirm that the KL information amount is maximized or minimized only when no permutation takes place.

Described first will be a case where the number of channels=2 is given.

In this experiment, at first, 40,000 samples were sampled from files "s1.wav" and "s2.wav" (sampling frequency 16 kHz) provided on a web site ("http://www.kecl.ntt.co.jp/icl/signal/mukai/demo/hscma2005/). Short-time Fourier transformation (window length=512 and shift width=128) was performed on the signal in this time domain. Two spectrograms (frequency bin number=257 and frame number=497) in which no permutation occurred were thus generated. From these two spectrograms, one frequency bin was selected according to certain references, and signals at the frequency bin were exchanged to cause artificially permutation. As the references for selecting the frequency bin, four ways were attempted: (a) the frequency bin had large power; (b) the frequency bin was selected from ω=1; and (c and d) the frequency bin was selected at random. In any of these ways, those frequencies bin that had once been selected were excluded from selections.

FIGS. 5A to 5D show states of spectrograms in case where frequencies bin were selected at random and signals were exchanged. In FIGS. 5A to 5D, signals were exchanged at 0% (0 frequency) of the original frequencies bin, 33% (85 frequencies), 67% (171 frequencies), and 100% (257 frequencies). Exchange of signals at 100% of the frequencies bin was equivalent to exchange of the whole spectrograms, and did not cause permutation.

Figure 6A:
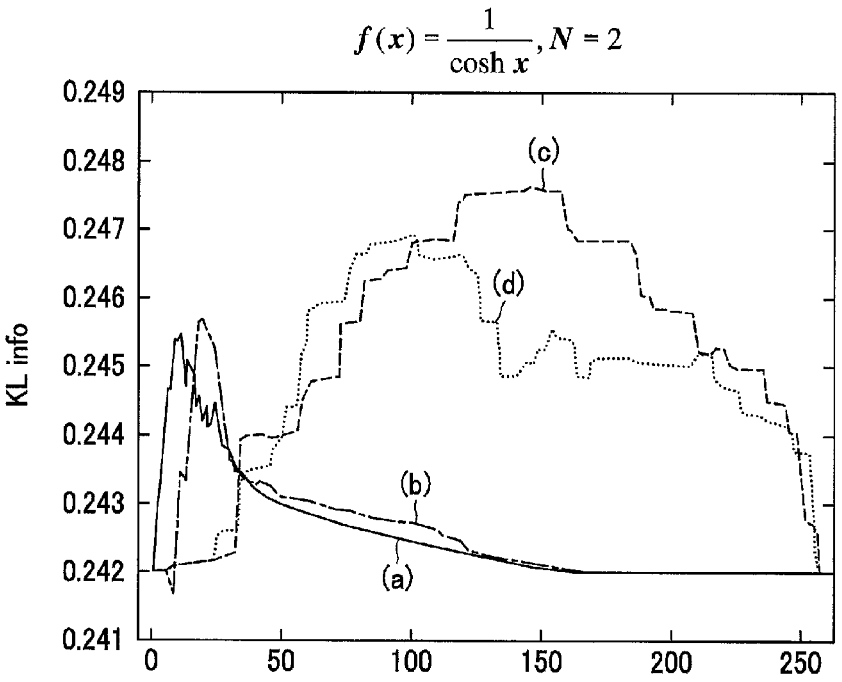
FIGS. 6A and 6B are graphs showing relationships between the number of frequencies bin (horizontal axis) at which signals are exchanged and the KL information amount (vertical axis) where the number of channels=2 is given.
Figure 6B:
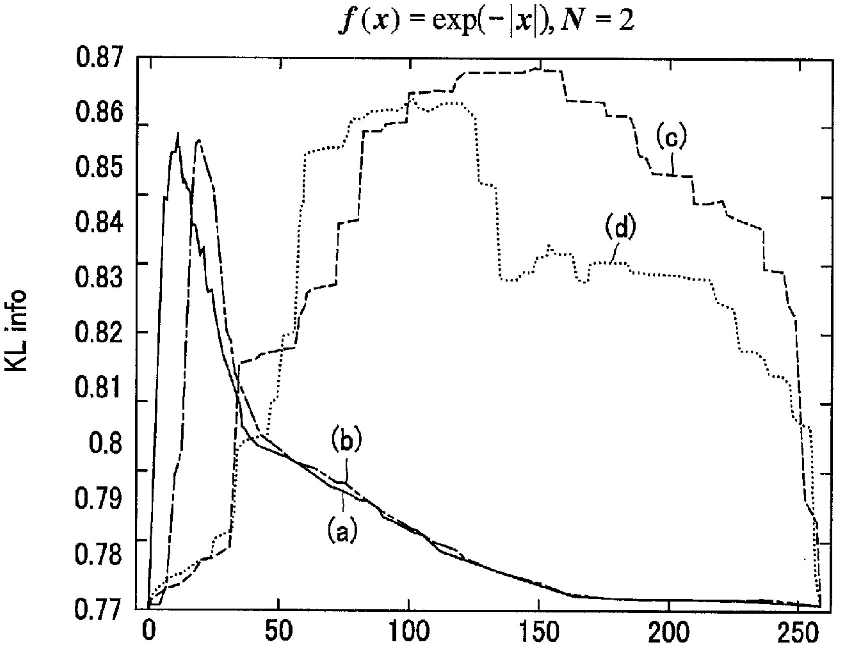
Figure 7A:
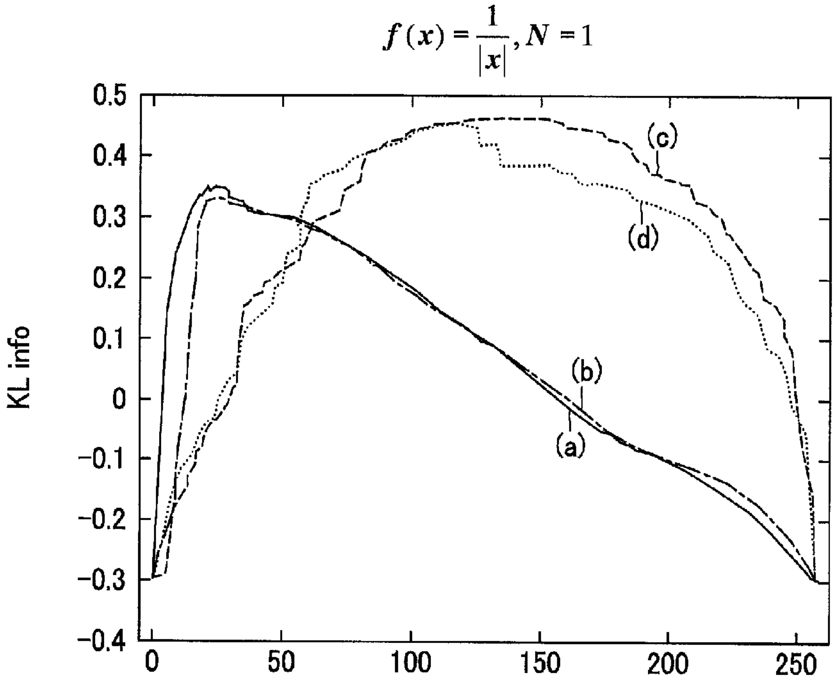
FIGS. 7A and 7B are graphs showing relationships between the number of frequencies bin (horizontal axis) at which signals are exchanged and the KL information amount (vertical axis) where the number of channels=2 is given.
Figure 7B:
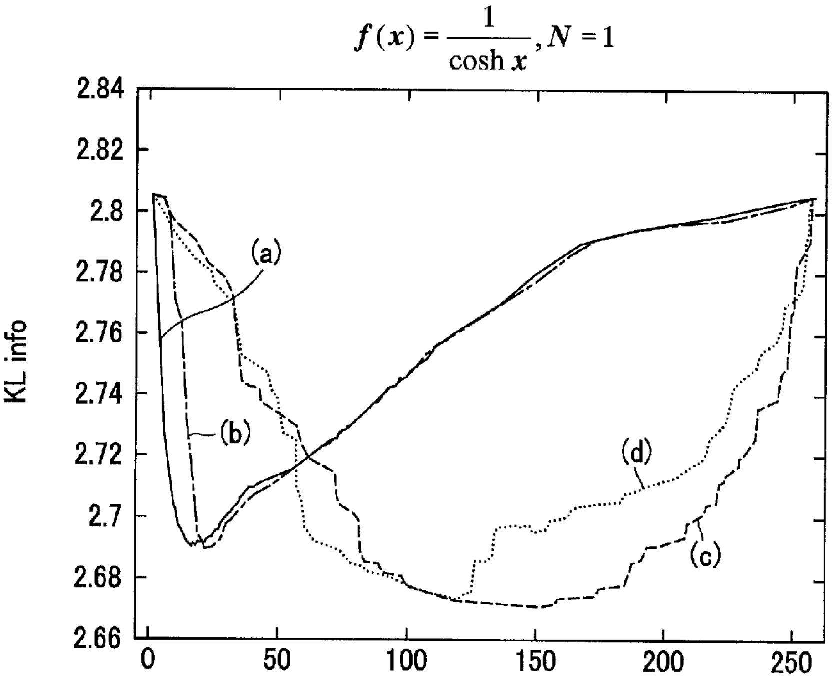
Figure 8:
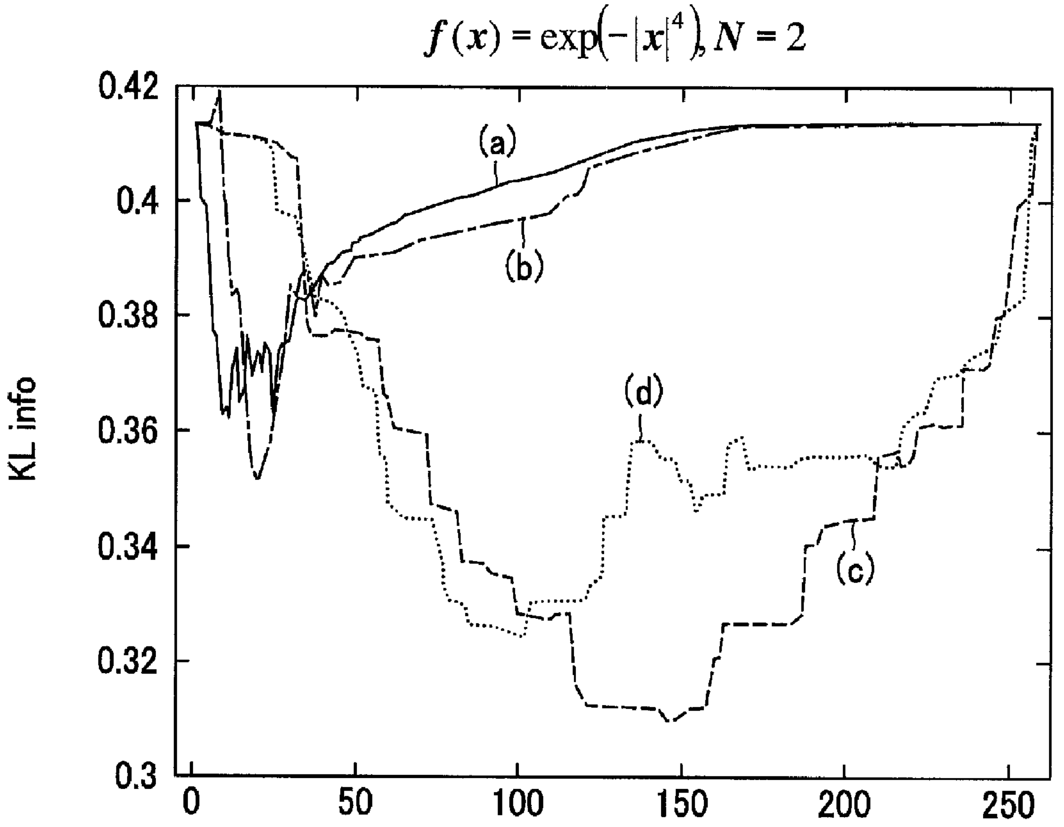
FIG. 8 is a graph showing relationships between the number of frequencies bin (horizontal axis) at which signals are exchanged and the KL information amount (vertical axis) where the number of channels=2 is given.

The KL information amount was calculated every time when signals at a frequency bin were exchanged. The relationship between the number of frequencies subjected to exchange (horizontal axis) and the KL information amount (vertical axis) was plotted. Plotted results are shown in FIGS. 6 to 8. Whether the characteristic curve is convex or concave differs depending on f( ) and the value of N. In any cases, the KL information amount takes a minimum value (where the characteristic curve is a convex curve) or a maximum value (where the characteristic curve is a concave curve) at both ends of the characteristic curve, i.e., in states where no permutation takes place. That is, the KL information amount was experimentally proved to be able to become a scale to measure the degree of permutation.

Results concerning functions not shown in FIGS. 6 to 8 are shown in the table 1 below. In this table 1,the symbol "∩" indicates a convex curve (having a minimum value at both ends) and "∪" indicates a concave curve (having a maximum value at both ends). The term "constant" indicates that a constant value is obtained regardless of the degree of permutation. Empty columns each mean that calculation diverges and no value can be calculated.

TABLE 1

| N | m | $f(x) = \frac{1}{\cosh^1(Kx^m)}$ | $f(x) = \exp(-K\,\lvert x\rvert^m)$ | $f(x) = \frac{1}{\lvert x\rvert^m}$ | $f(x) = \exp(-\tanh Kx^m)$ | $f(x) = \exp(-\cosh Kx^m)$ |
|---|---|---|---|---|---|---|
| 1 | 1 | ∪ | constant | ∩ | ∩ | ∪ |
| 1 | 2 | ∪ | ∪ | ∩ | ∩ | ∪ |
| 1 | 3 | ∪ | ∪ | ∩ | ∩ | |
| 2 | 1 | ∩ | ∩ | ∩ | ∩ | ∪ |
| 2 | 2 | ∪ | constant | ∩ | ∩ | ∪ |
| 2 | 3 | ∪ | ∪ | ∩ | ∪ | ∪ |

If a convex function is used, the problem of permutation can be solved by exchanging signals at the frequency bin such that the KL information amount decreases. Otherwise, if a concave function is used, the problem of permutation can be solved by exchanging signals at the frequency bin such that the KL information amount increases.

Whether the characteristic curve of the KL information amount is convex or concave depends on whether f( ) has a super-gaussian distribution or a sub-gaussian distribution where f( ) is regarded as a primary probability density function. The term of “super-gaussian” represents a kind of distribution which is sharper in the vicinity of an average value and is smoother (having wider skirts) in the periphery than a regular (gaussian) distribution. On the other side, the “sub-gaussian” represents another kind of distribution which is smoother in the vicinity of an average value and has narrower skirts in the periphery.

A next description will be made of a case where the number of channels=3 is given.

In this experiment as well, at first, 40,000 samples were sampled from files “s1.wav”, “s2.wav” and “s3.wav” (sampling frequency 16 kHz) provided on a web site (“http://www.kecl.ntt.co.jp/icl/signal/mukai/demo/hscma2005/). Short-time Fourier transformation (window length=512 and shift width=128) was performed on the signal in this time domain. Three spectrograms (frequency bin number=257 and frame number=497) in which no permutation occurred were thus generated. From these three spectrograms, one frequency bin was selected according to references (a) to (d) described previously. Signals at the frequency bin were exchanged to cause artificially permutation.

FIGS. 9A to 9D show states of spectrograms in case where frequencies bin were selected at random and signals were exchanged. In FIGS. 9A to 9D, signals were exchanged at 0% (0 frequency) of the original frequencies bin, 33% (85 frequencies), 67% (171 frequencies), and 100% (257 frequencies). Since the number of channels=3 was given, permutation occurred even when signals were exchanged at 100% of the frequencies bin.

Figure 10A:
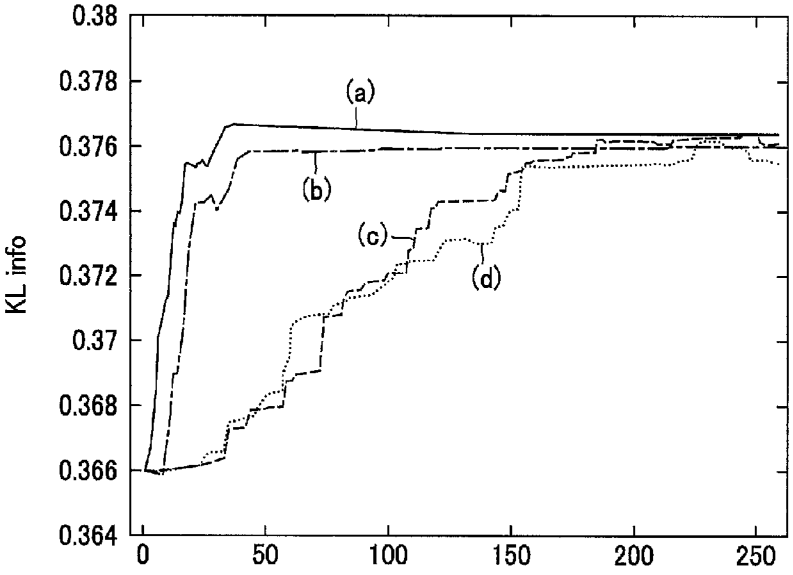
FIGS. 10A and 10B are graphs showing relationships between the number of frequencies bin (horizontal axis) at which signals are exchanged and the KL information amount (vertical axis) where the number of channels=3 is given.
Figure 10B:
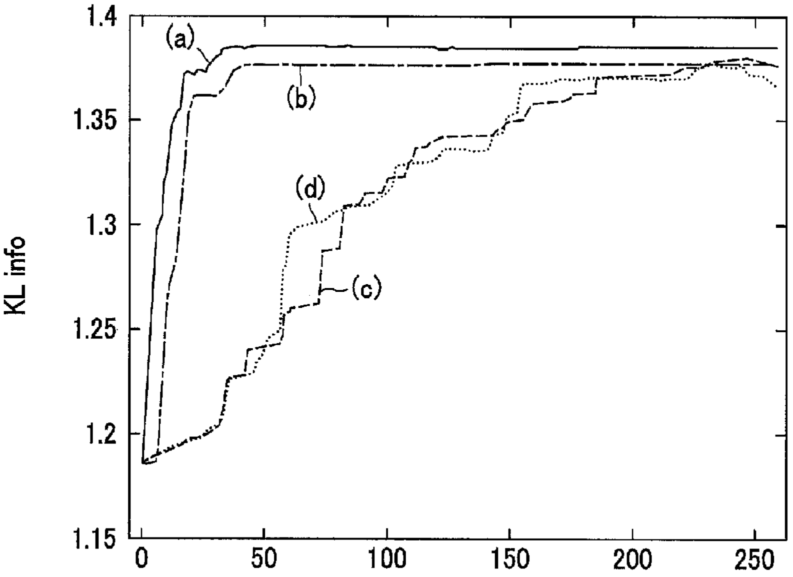
Figure 11A:
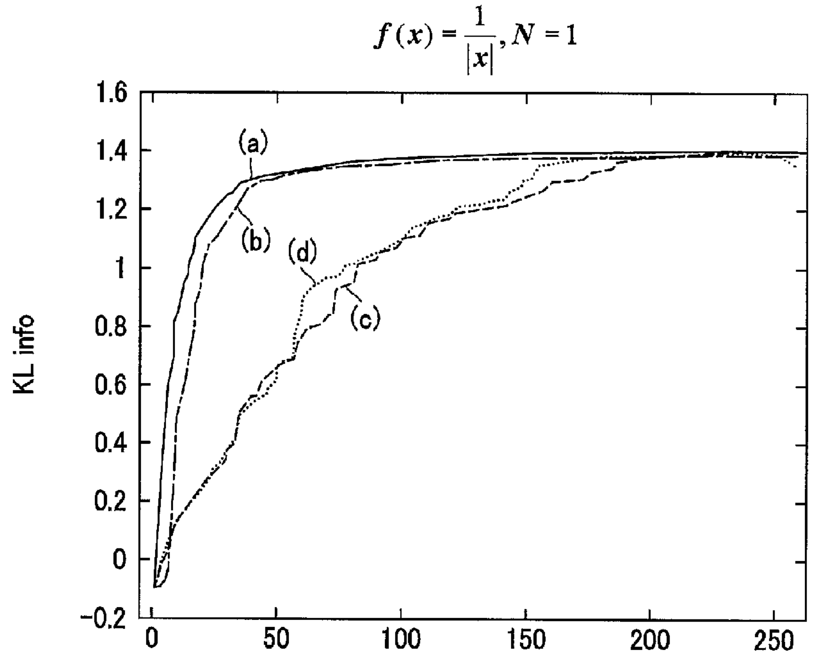
FIGS. 11A and 11B are graphs showing relationships between the number of frequencies bin (horizontal axis) at which signals are exchanged and the KL information amount (vertical axis) where the number of channels=3 is given.
Figure 11B:
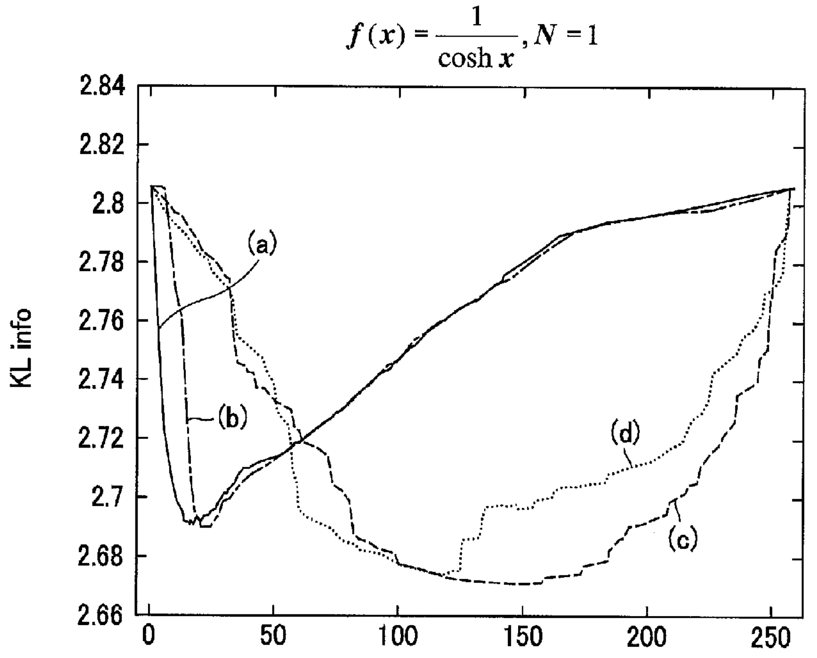
Figure 12:
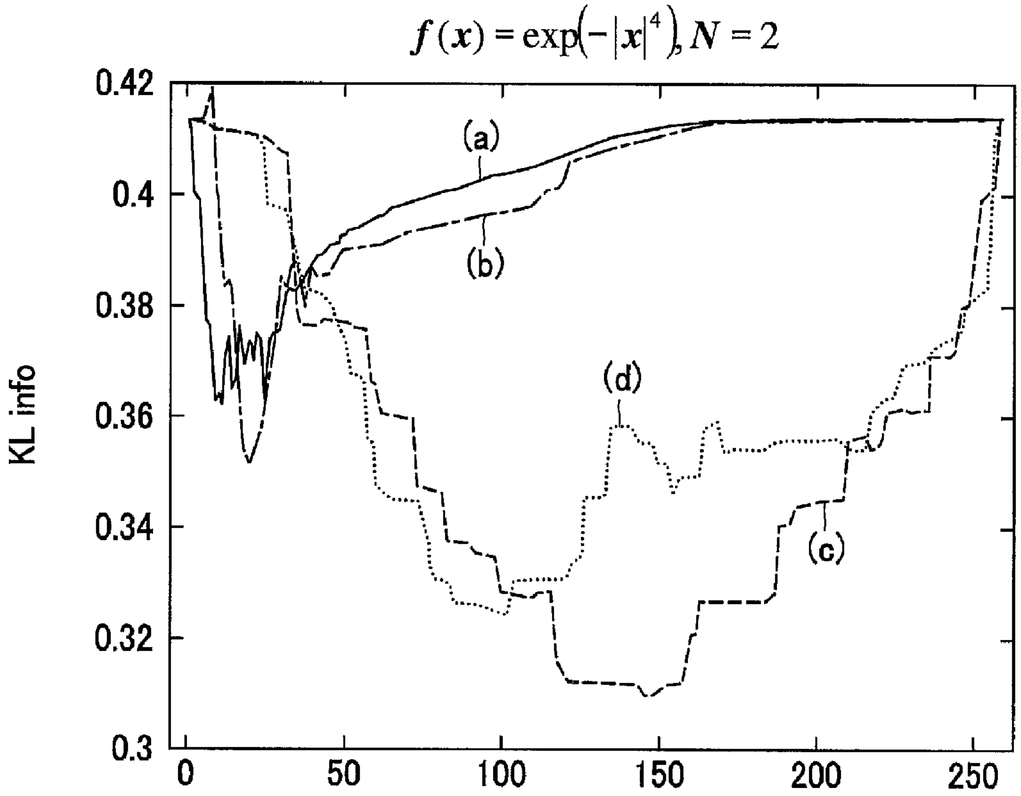
FIG. 12 is a graph showing relationships between the number of frequencies bin (horizontal axis) at which signals are exchanged and the KL information amount (vertical axis) where the number of channels=3 is given.

The KL information amount was calculated every time when signals at a frequency bin were exchanged. The relationship between the number of frequencies subjected to exchange (horizontal axis) and the KL information amount (vertical axis) was plotted. Plotted results are shown in FIGS. 10 to 12. Whether the characteristic curve is convex or concave differs depending on f( ) and the value of N. In any cases, the KL information amount takes a minimum value (where the characteristic curve is a convex curve) or a maximum value (where the characteristic curve is a concave curve) at left end of the characteristic curve, i.e., in states where no permutation takes place. That is, the KL information amount was experimentally proved to be able to become a scale to measure the degree of permutation.

In the above, descriptions have been made in case of using a multidimensional probability density function based on an L-N norm, for example. However, another multidimensional probability density function can be used.

For example, in the above expression (9), the value substituted into f( ) may be changed from the L-N norm to a Mahalanobis distance (square root of $Y_k(t)^H\Sigma_k^{-1}Y_k(t)$). Then, the following expression (21) is obtained. The probability density function given by the expression (21) is called elliptical distribution. In the present embodiment, a probability density function based on this elliptical distribution can be used. In the expression (21), $Y_k(t)^H$ is a Hermitian transposition of $Y_k(t)$ (elements are replaced with complex conjugate numbers and vectors or matrices are transposed). Further, $\Sigma_k$ is a variance-covariance matrix of $Y_k(t)$ and is calculated by the expression (22) below.

$$P_{Yk}(Y_k(t)) = hf\left(\sqrt{Y_k(t)^H \sum_k^{-1} Y_k(t)}\right) \tag{21}$$

$$\sum_k = E_t[Y_k(t)Y_k(t)^H] = \frac{1}{T-1} Y_k Y_k^H \tag{22}$$

Figure 13A:
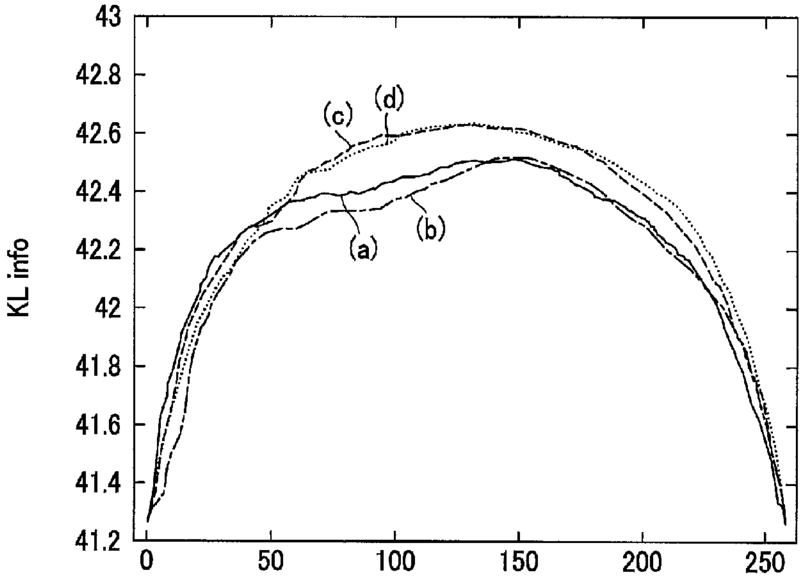
FIGS. 13A and 13B are graphs showing relationships between the number of frequencies bin (horizontal axis) at which signals are exchanged and the KL information amount (vertical axis) where the number of channels=2 and $f(x)=\exp(-|x|)$ are given.

If the number of channels=2 and f(x)=exp(−|x|) are given, the relationship between the number of frequencies bin at which signals are exchanged (horizontal axis) and the KL information amount (vertical axis) is shown in FIG. 13A. Whether the characteristic curve is convex or concave is determined depending on f( ). A tendency thereof is the same as that of N=2 in case of using an L-N norm. However, a smooth characteristic curve which is not dependent on the power for each frequency bin but is maximized (or minimized) at the substantial center can be obtained by multiplying an inverse matrix of the variance-covariance matrix $\Sigma_k$. As shown in FIGS. 6 to 8, the characteristic curves of the KL information amount have local inversions, e.g., a basically convex characteristic curve includes a portion where the KL information amount decreases in spite of increase in the degree of permutation. There is a possibility that these local inversions becomes a factor which causes a failure in solution of the problem of permutation. However, the possibility is low if the KL information amount is calculated by use of elliptical distribution.

Figure 13B:
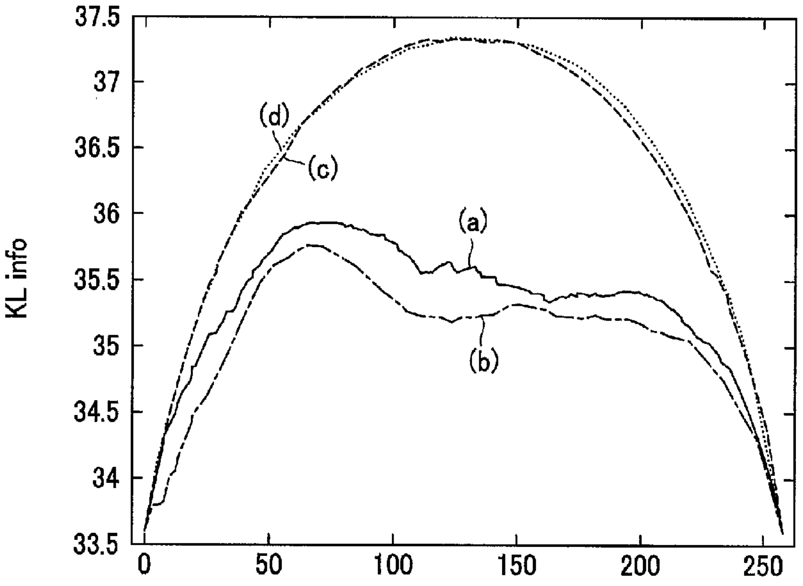

It takes time if a variance-covariance matrix is calculated every time when signals at a frequency bin are exchanged. Hence, only diagonal elements of a variance-covariance matrix may be used. In this case, characteristic curves having substantially the same characteristics as shown in FIG. 13B are obtained.

In the present embodiment, a probability density function based on a Copula model can be used as a further another multidimensional probability density function. The multidimensional probability density function based on a Copula model is described in the description and drawings included in Japanese Patent Application No. 2005-18822 which the present applicant proposed previously.

(Multidimensional Kurtosis)

Kurtosis is also called a fourth order cumulant and is used as a scale to measure how far signal distribution differs from regular distribution.

Kurtosis of a multidimensional amount (the number of dimensions is M since spectrograms of the frequency bin number=M are used) is defined by the expression (23) below. The kurtosis is 0 when the distribution of a vector $Y_k(t)$ is regular distribution (multivariate normal distribution); a positive value when the distribution of the vector $Y_k(t)$ is super-gaussian distribution; or a negative value when the distribution of the vector $Y_k(t)$ is sub-gaussian distribution.

$$\kappa(Y_k) = \frac{E_t\left[\left(Y_k(t)^H \sum_k^{-1} Y_k(t)\right)^2\right]}{M(M+2)} - 1 \tag{23}$$

Suppose now that a spectrogram in which no permutation takes place is other distribution than regular distribution. In general, a discontinuous sound (like a voice) tends to have super-gaussian distribution easily. A continuous sound (like a music wave) tends to have sub-gaussian distribution easily. On the other side, when permutation takes place, plural signals are mixed up so that the distribution thereof approximates to regular distribution. That is, when kurtosis of each channel is calculated, the kurtosis becomes closer to zero as the degree of permutation increases greater. Therefore, the total sum of absolute values of kurtoses of respective channels (which will be hereinafter called "total kurtosis") as expressed by the following expression (24) can be used as a scale to measure the degree of permutation. Note that the total kurtosis increases as the degree of permutation decreases.

$$\kappa(Y) = \sum_{k=1}^{n} |\kappa(Y_k)| \tag{24}$$

Figure 14A:
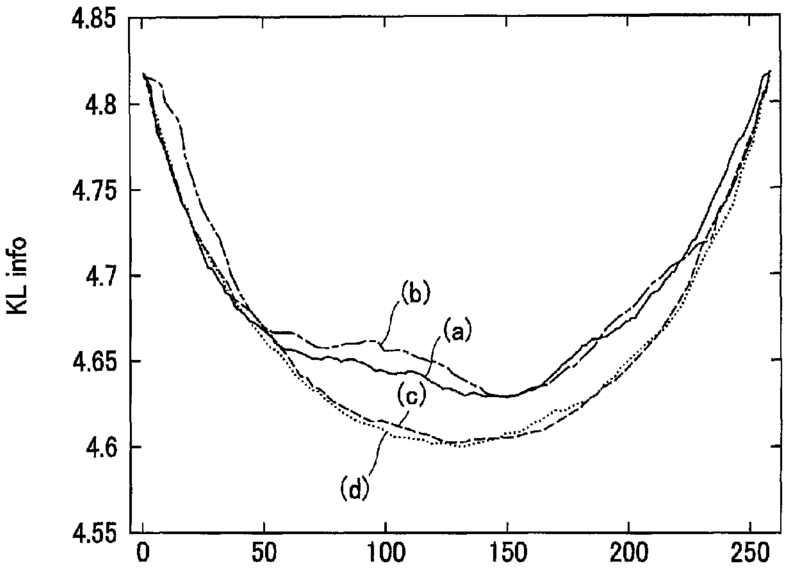
FIGS. 14A and 14B are graphs showing relationships between the number of frequencies bin (horizontal axis) at which signals are exchanged and the total kurtosis (vertical axis) where the numbers of channels are 2 and 3.
Figure 14B:
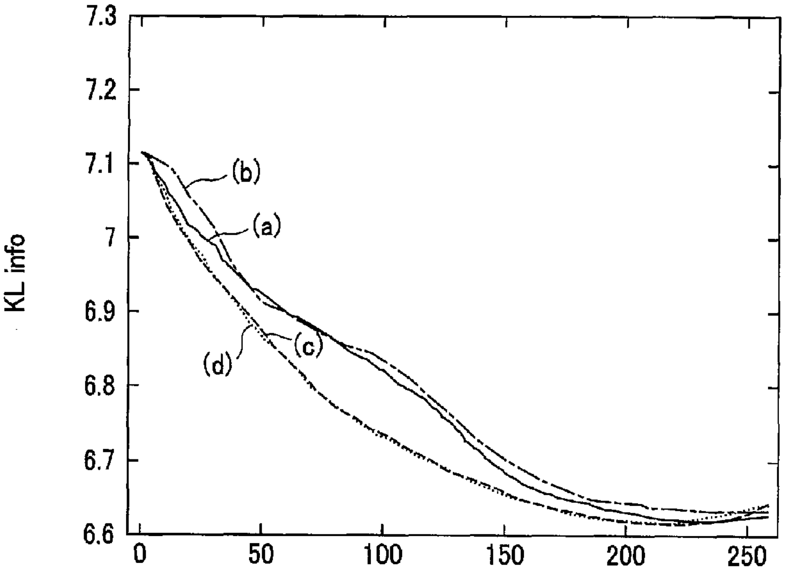

One frequency bin was selected according to the references (a) to (d) described previously, with respect to two spectrograms obtained from the files "s1.wav" and "s2.wav" also described previously. Every time when signals at the selected frequency bin were exchanged, the total kurtosis was calculated. At this time, the relationship between the number of frequencies bin at which signals were exchanged (horizontal axis) and the total kurtosis (vertical axis) was plotted. Plotted results are shown in FIG. 14A. Further, one frequency bin was selected according to the references (a) to (d) described previously, with respect to three spectrograms obtained from the files "s1.wav", "s2.wav", and "s3.wav" also described previously. Every time when signals at the selected frequency bin were exchanged, the total kurtosis was calculated. At this time, the relationship between the number of frequencies bin at which signals were exchanged (horizontal axis) and the total kurtosis (vertical axis) was plotted. Plotted results are shown in FIG. 14B. In any cases, the total kurtosis takes a maximum value in a state where no permutation takes place (e.g., at both ends in FIG. 14A and at the left end in FIG. 14B). Therefore, if the total kurtosis is used as a scale to measure the degree of permutation, the problem of permutation can be solved by exchanging signals between channels such that the total kurtosis increases.

In case of using kurtosis, only diagonal elements of the variance-covariance matrix may be used in place of calculating all elements of the variance-covariance matrix, like in case of using elliptical distribution.

Further, all elements of $Y_k(t)$ do not necessarily have to be used. For example, the power $D(\omega)$ for each frequency bin (for each $\omega$) may be calculated according to the expression (8) described previously, and only those elements that correspond to L frequencies bin having higher powers may be used.

(Specific Configuration of the Audio Signal Separation Device)

The above descriptions have been made to a point that the KL information amount calculated by use of a multidimensional probability density function and the multidimensional kurtosis can be used as scales to measure the degree of permutation. Hereinafter, specific configuration of an audio signal separation device according to the present embodiment will be described.

Figure 15:
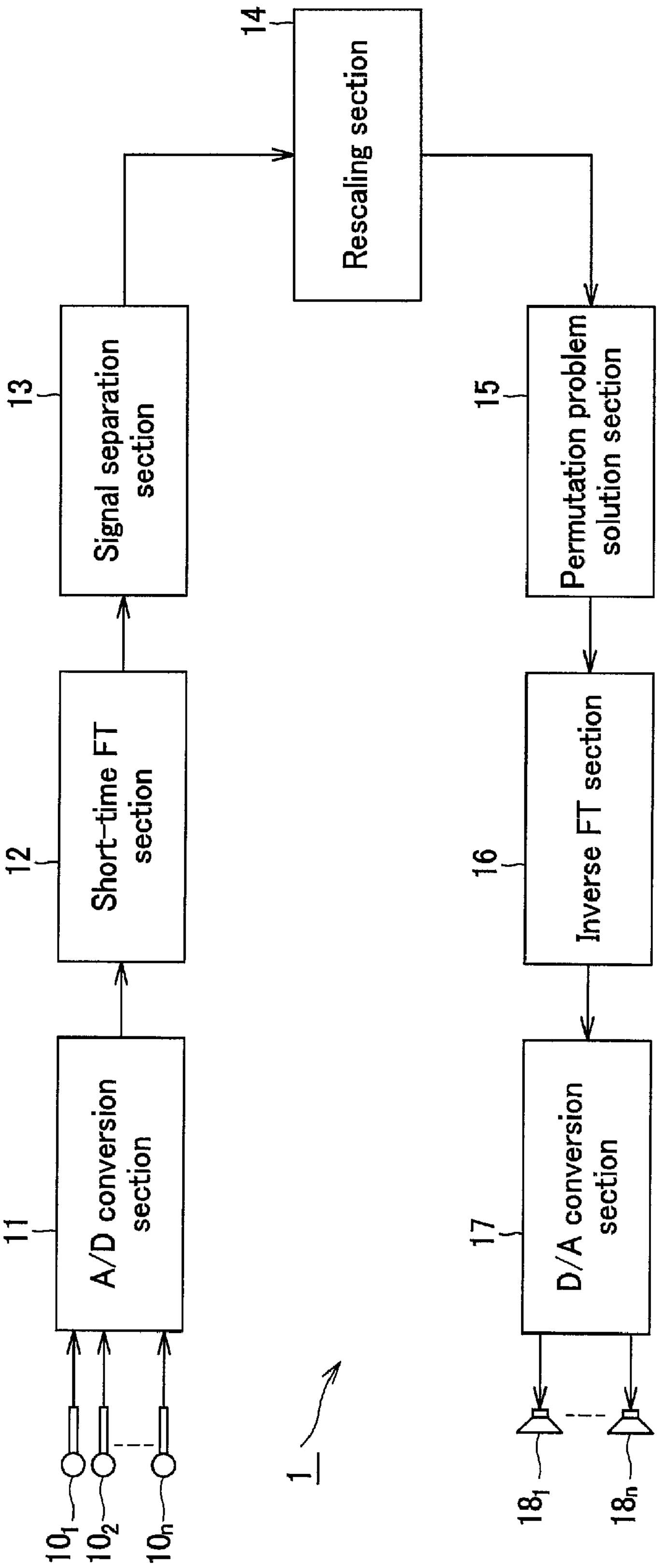
FIG. 15 is a diagram showing schematic configuration of an audio signal separation device according to the present embodiment.

FIG. 15 shows schematic configuration of the audio signal separation device according to the present embodiment. In this audio signal separation device 1, n microphones $10_1$ to $10_n$ observe independent sounds generated from n sound sources. An A/D (Analogue/Digital) conversion section 11 converts signals of the sounds to obtain observation signals. A short-time Fourier transformation section 12 performs short-time Fourier transformation on the observation signals, to generate spectrograms of the observation signals. A signal separation section 13 performs separation processing on the spectrograms of the observation signals for each frequency bin, to generate spectrograms of separate signals.

A rescaling section 14 performs processing of aligning the scale with each frequency bin of the spectrograms of the separate signals. If normalization processing (averaging or divergence adjustment) has been effected on the observation signals before the separation processing, the resealing section 14 performs restoring processing. With respect to spectrograms of separate signals in which permutation takes place, a permutation problem solution section 15 exchanges signals for each frequency bin, based on the KL information amount calculated by use of a multidimensional probability density function or multidimensional kurtosis, thereby to solve the problem of permutation. An inverse Fourier transformation section 16 performs inverse Fourier transformation on the spectrograms of the separate signals of which the problem of permutation has been solved, thereby to generate separate signals in time domain. A D/A conversion section 17 performs D/A conversion on the separate signals in time domain, and n loudspeakers $\mathbf{18}_1$ to $\mathbf{18}_n$ respectively reproduce independent sounds.

The audio signal separation device 1 is configured to reproduce sounds through the n loudspeakers $\mathbf{18}_1$ to $\mathbf{18}_n$. However, separate signals may be outputted and subjected to voice recognition. In this case, the inverse Fourier transformation may appropriately be omitted.

Figure 16:
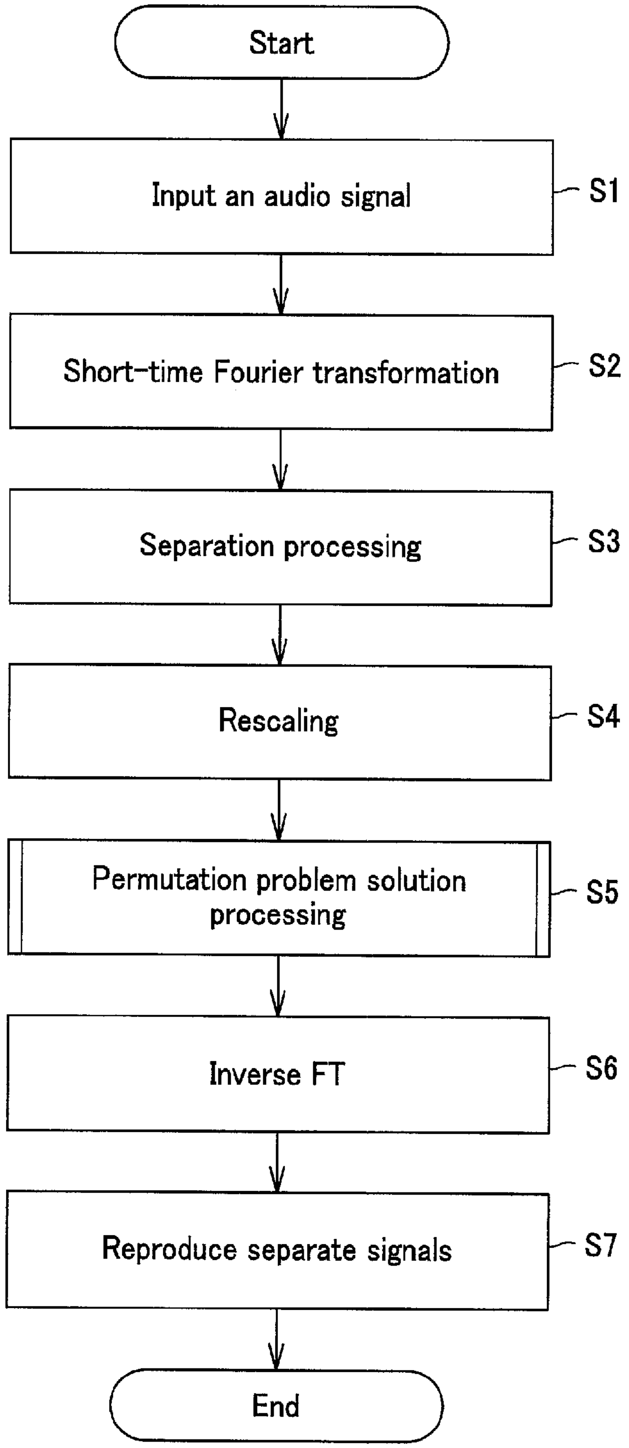
FIG. 16 is a flowchart explaining outline of processing by the audio signal separation device.

Outline of processing executed by the audio signal separation device will now be described with reference to the flowchart shown in FIG. 16. At first in step S1, audio signals are observed via microphones. In step S2, short-time Fourier transformation is performed on observation signals to generate spectrograms. In next step S3, separation processing is performed for each frequency bin, with respect to the spectrograms of the observation signals, thereby to generate spectrograms of separate signals. Applicable to this separation processing are existing independent component analysis methods such as an extended informax method, Fast ICA, JADE, etc.

Permutation has taken place in the separate signals obtained in step S3, and the scales of respective frequencies bin are different from one another. Hence, in step S4, rescaling processing is carried out to align the scales between the frequencies bin. In this step, processing for restoring an original average and an original standard deviation which have been changed through normalization processing is performed. In subsequent step S5, with respect to spectrograms of separate signals in which permutation has taken place, signals are exchanged for each frequency bin, based on the KL information amount calculated by use of a multidimensional probability density function or based on multidimensional kurtosis, to solve the problem of permutation. Details of this step S5 will be described later. In subsequent step S6, inverse Fourier transformation is performed on spectrograms of separate signals of which the problem of permutation has been solved, thereby to generate separate signals in time domain. In step S7, the separate signals are reproduced through the loudspeakers.

Details of permutation problem solution processing in step S5 described above will now be described with reference to FIG. 17. Where the number of channels is n, there are n! combinations of permutations for each frequency bin. If the number of frequencies bin is M, the total number of combinations becomes a huge number $(n!)^M$. Consequently, all combinations are not able to be verified in practice, and hence, nearly optimum combinations are searched for in the order of n!×M, in the flowchart of FIG. 17.

At first in step S11, a permutation including numbers of frequencies bin is generated. In other words, where the number of frequencies bin is M, such a permutation in which numbers of 1 to M each appear one time is generated. In the subsequent processing, frequencies bin are selected along this permutation. Used as this permutation is one selected from (a) a permutation arranged in the order from ω=1 to ω=M, (b) a permutation arranged in the order from ω=M to ω=1,(c) a permutation arranged in the order from the frequency bin having the greatest power, and (d) a permutation arranged at random. The permutation (c) can be generated by obtaining the power for each frequency bin, according to the expression (8) described previously, and by sorting the obtained powers in the descending order. Hereinafter, the permutation generated in this way is expressed as [bin(1), . . . bin(M)].

Next in step S12, all permutations including channel numbers are generated. These permutations show combinations of channels between which signals are exchanged for each frequency bin. Where the channel number is n, there are n! combinations. If the generated permutation is expressed as $[a_1, \ldots a_k, \ldots a_n]$, $a_k$ indicates that "the signal of the channel k after exchange is the same as that of the channel $a_k$ before exchange". For example, if n=2 is given, there are two permutations of [1, 2] and [2, 1] which respectively mean "nothing replaced" and "channels 1 and 2 exchanged". Where n=3 is given, there are six permutations of [1, 2, 3] up to [3, 2, 1]. For example, [2, 1, 3] of the six permutations indicates that "channels 1 and 2 are exchanged with the channel 3 kept intact". In the following, these permutations are expressed by a parameter of p(1), p(2), . . . , p(n!). Note that p(1) indicates [1, 2, . . . , n], i.e., "no channel replaced".

In subsequent step S13, Y is substituted with Y'. Y is a parameter to store spectrograms after exchanging signals at a frequency bin. Y' indicates spectrograms in which permutation takes place immediately after separation.

Steps S14 to S24 constitute an outer loop which is repeated a number of times described later. The meaning of this outer loop will be also described later. Steps S15 to S23 constitute a loop concerning the frequency bin. In this loop, frequencies bin are selected according to the permutation ([bin(1), . . . , bin(M)]) generated in step S11. Signals at the selected frequencies bin are exchanged between channels. In subsequent steps, signals at the ω-th frequency bin are repeatedly used. Therefore, in step S16, the signals at the ω-th frequency bin are stored as a parameter $Y_{tmp}$. $Y_{tmp}$ is a matrix having the same dimensions as Y(ω), i.e., a matrix including n row vectors $Y_{tmp1}$ to $Y_{tmpn}$. Steps S17 to S20 constitute a loop with respect to the permutation of channel numbers. This loop is let cycle with respect to the n! permutations (p(1), p(2), . . . , p(n!)) obtained in step S12, and signals at the frequency bin are exchanged between channels, according to each of the permutations.

Specifically, in step S18, Y(ω) is substituted with a resultant obtained by performing exchange on $Y_{tmp}$, according to p(j). For example, where n=3 and p(j)=[2, 1, 3] are given, $Y_1(\omega)=Y_{tmp2}$, $Y_2(\omega)=Y_{tmp1}$, and $Y_3(\omega)=Y_{tmp3}$ are obtained.

In subsequent step S19, the KL information amount of the entire Y or multidimensional kurtosis is calculated. At this time, not only Y(ω) but also the entire Y (or substantially entire Y) are used. Therefore, even if wrong exchange takes place at a particular frequency bin, there is no risk of causing wrong exchange in all of subsequent frequencies bin.

The processings of steps S18 and S19 are carried out with respect to all permutations of channel numbers, to calculate the KL information amount or multidimensional kurtosis. In step S21, indexes corresponding to maximum or minimum values thereof are obtained. If an obtained index is j', the exchange combination p(j') corresponding to j' can be the exchange method which solves the problem of permutation of the ω-th frequency bin, with high possibility. Hence, in step S22, Y(ω) is substituted with a resultant obtained by performing exchange on $Y_{tmp}$, according to p(j'). The processing from step S16 to step S22 is performed on all frequencies bin.

If the processing from step S15 to step S23 is performed not only one time but also two or three times, the problem of permutation can be solved to a higher degree. More specifically, a frequency bin of which the problem of permutation is not solved may remain after performing the processing one time. However, this problem of permutation may be solved after performing the processing two or more times. Therefore, the loop is let cycle outside steps S15 to S23. The number of repetitions of this outer loop may be fixed (e.g., three times) or the outer loop may cycle until the number of frequencies bin at which permutation has taken place in step S22, i.e., the number of frequencies bin which give j'≠1 becomes a constant number (e.g., 10) or smaller or becomes a constant rate (e.g., 5%) or lower.

In a stage after coming out of the outer loop, a spectrogram of which the problem of permutation had been solved has been stored as the parameter Y.

With reference to the flowchart described above, the permutations including numbers of the frequencies bin and generated in step S11 has been described as being kept used. However, this step S11 may be shifted into the outer loop. Accordingly, a different permutation may be used every time the outer loop is repeated. For example, in the first cycle, the permutation of frequencies bin "arranged in the order from the frequency bin having the greatest power" may be used. In the second cycle, the permutation of frequencies bin "arranged in the order from ω=1 to ω=M" may be used.

(Specific Examples of Results of Solving the Problem of Permutation)

Specific examples of results of solving the problem of permutation will now be described. In the following, the KL information amount was calculated where $f(x)=1/|x|^m$ and L=1 were given in the multidimensional probability density function based on the L-N norm, according to the expression (9) described previously. Based on this KL information amount, the problem of permutation was solved. The sampling frequency of a used observation signal was 16 kHz. In short-time Fourier transformation, a Hanning window having a window length of 512 (the number of frequencies bin is 257) was used with a shift width of 128. Further, the outer loop in the flowchart shown in FIG. 17 was repeated three times. The permutation including numbers of frequencies bin and generated in step S11 in FIG. 15 was the permutation of frequencies bin arranged in the order from the frequency bin having the greatest power.

Figure 18:
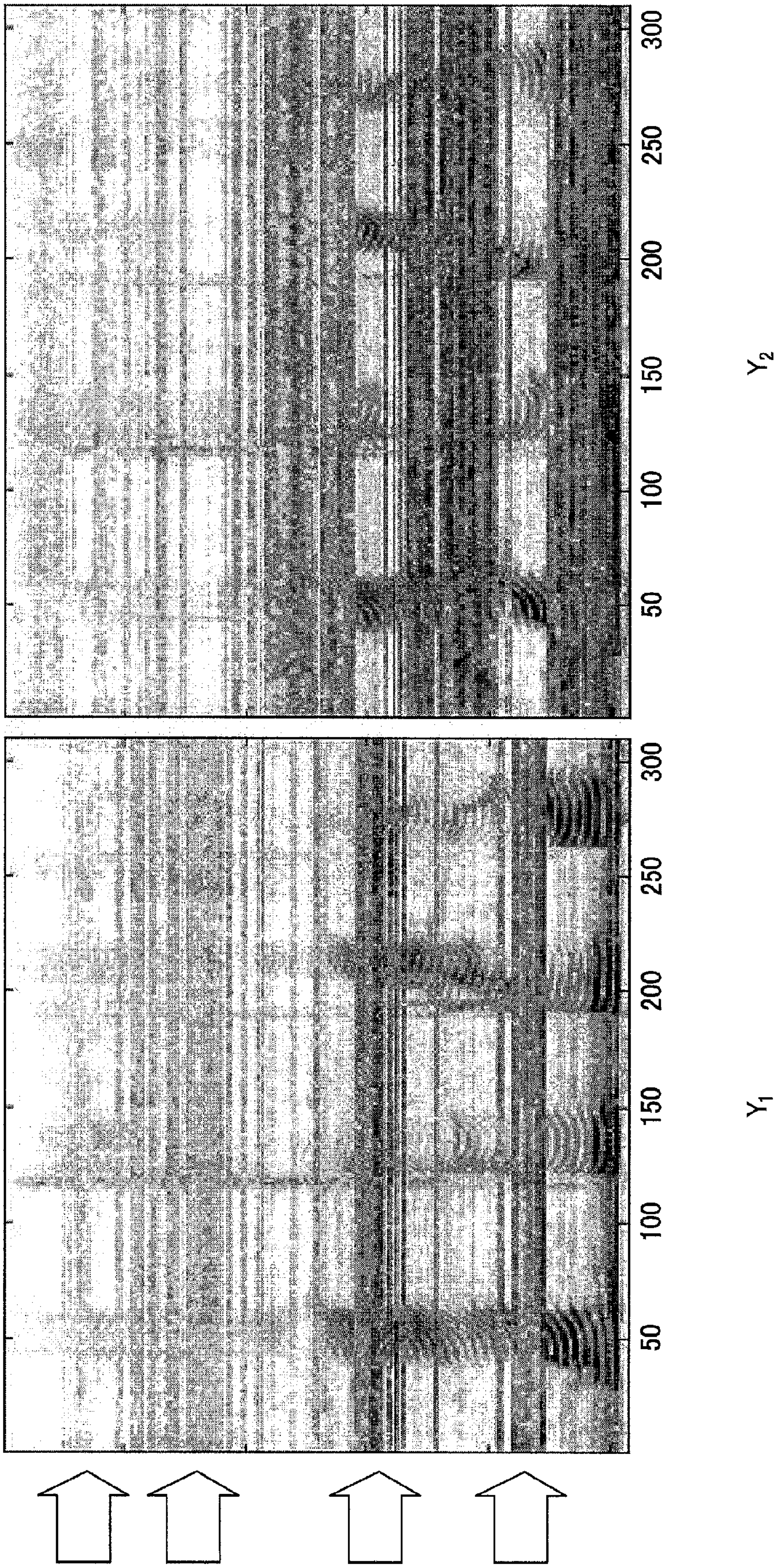
FIG. 18 shows a result of performing separation processing according to an existing method.

At first, 40,000 samples were sampled from the top of a file "X_rsm2.wav" (sampling frequency 16 kHz) provided on a web site ("http://www.ism.ac.jp/ shiro/research/blindsep.html). Separation processing was performed on these samples, according to an existing independent component analysis method, e.g., according to an extended infomax method with pre-whitening. FIG. 18 shows results thereof (corresponding to Y'). As can be seen from FIG. 18, permutation takes place like bands at frequencies bin indicated by arrows.

Figure 19:
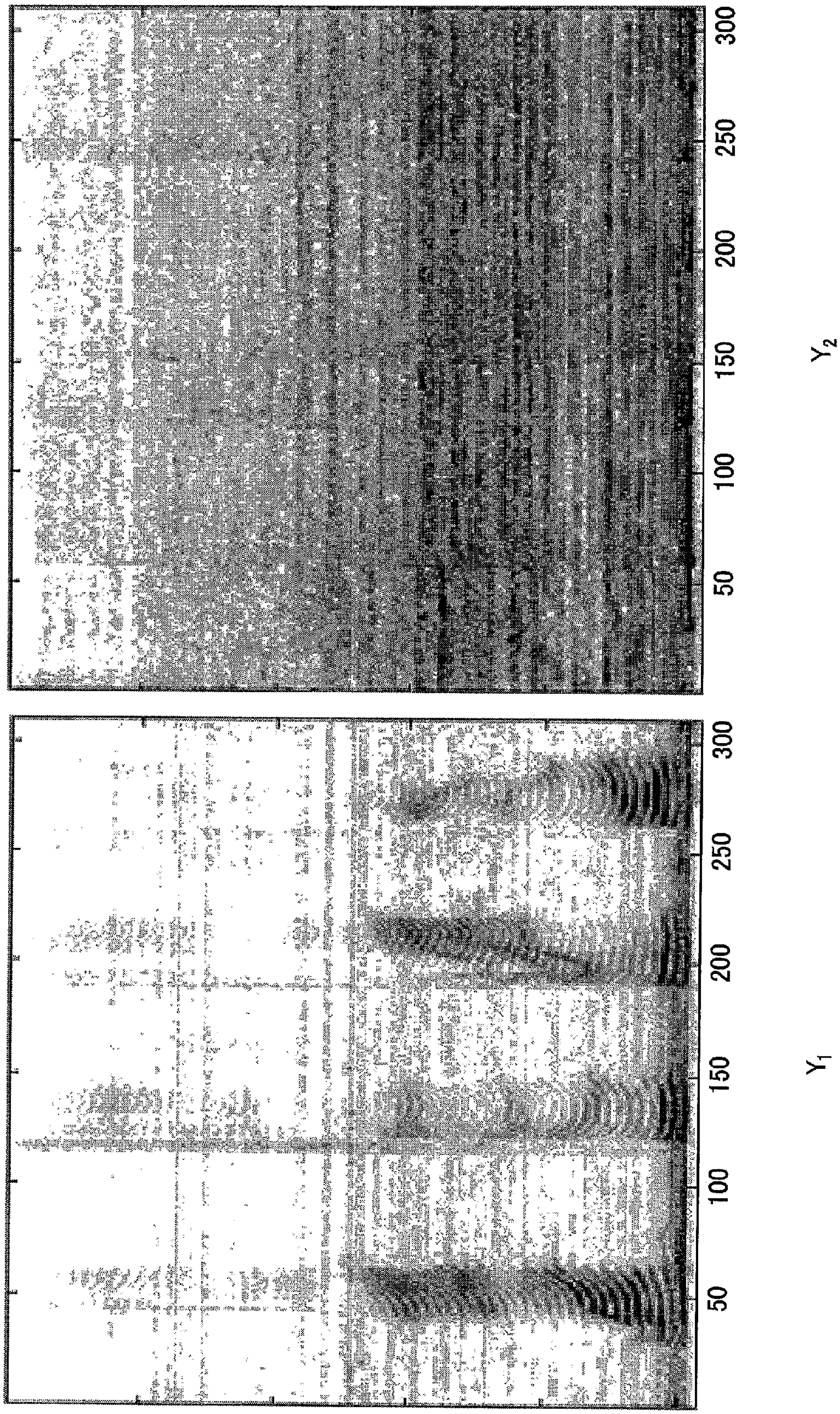
FIG. 19 shows a result of solving the permutation problem with respect to spectrograms in FIG. 18, according to a method of the present embodiment.

Permutation problem solution processing was performed on this spectrogram, according to the method of the present embodiment. FIG. 19 shows results thereof (corresponding to Y). As can be seen from FIG. 19, the permutation problem was solved substantially. Note that $Y_1$ is a spectrogram corresponding to voices of "one, two, three, four". $Y_2$ is a spectrogram corresponding to music.

Described next will be results of carrying out permutation problem solution processing on permutation artificially created, according to the method of the present embodiment.

At first, two examples will be cited in case where the number of channels=2 is given.

Figure 5A:
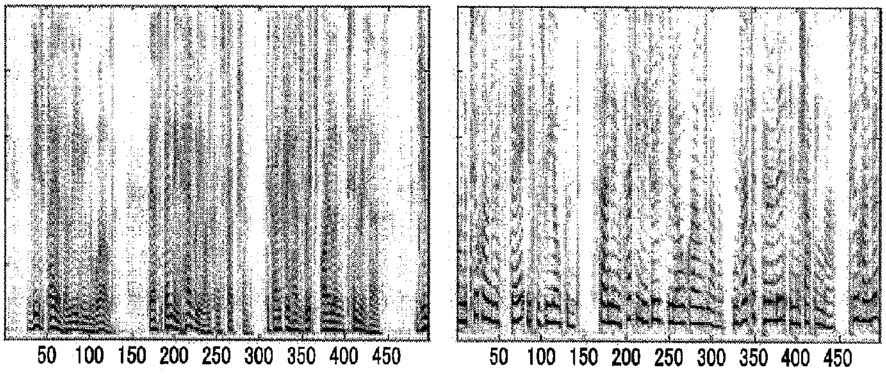
FIGS. 5A to 5D show states of spectrograms in case where signals are exchanged at frequencies bin selected at random where the number of channels=2 is given.
Figure 5B:
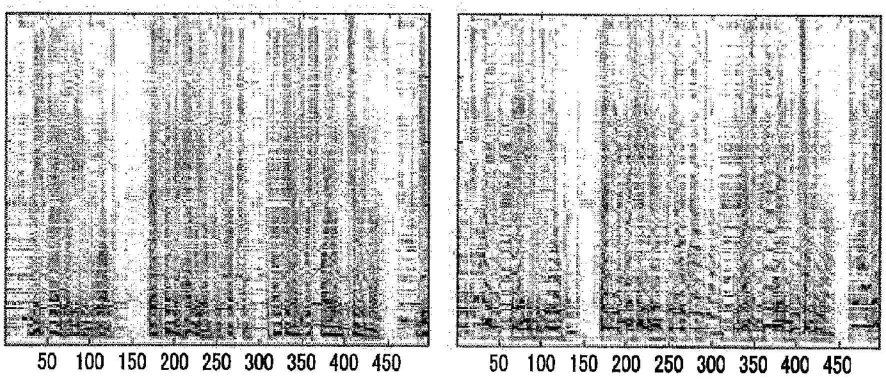
Figure 5C:
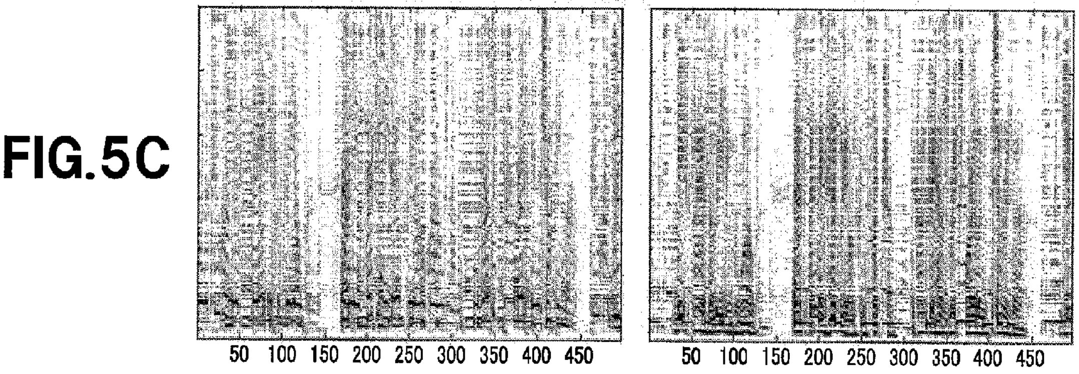
Figure 5D:
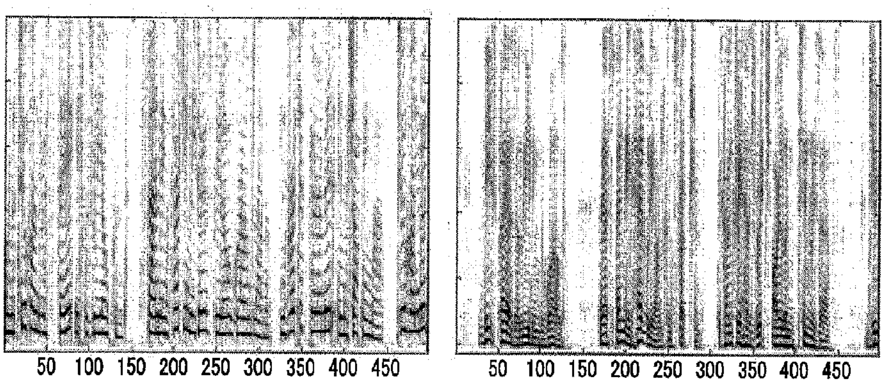
Figure 20B:
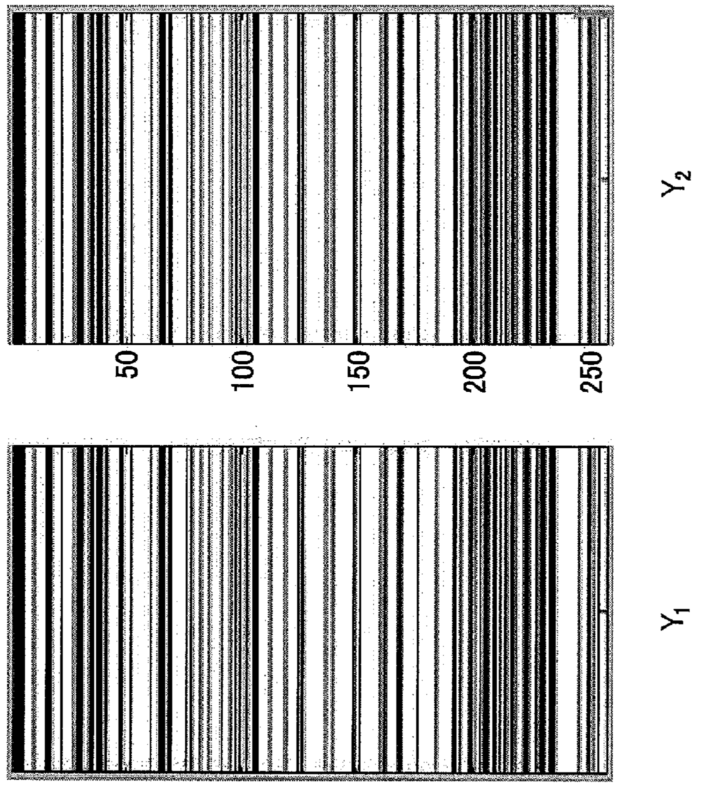
FIGS. 20A and 20B show spectrograms in case of exchanging signals at frequencies bin of about 33% where the number of channels=2 was given.
Figure 20A:
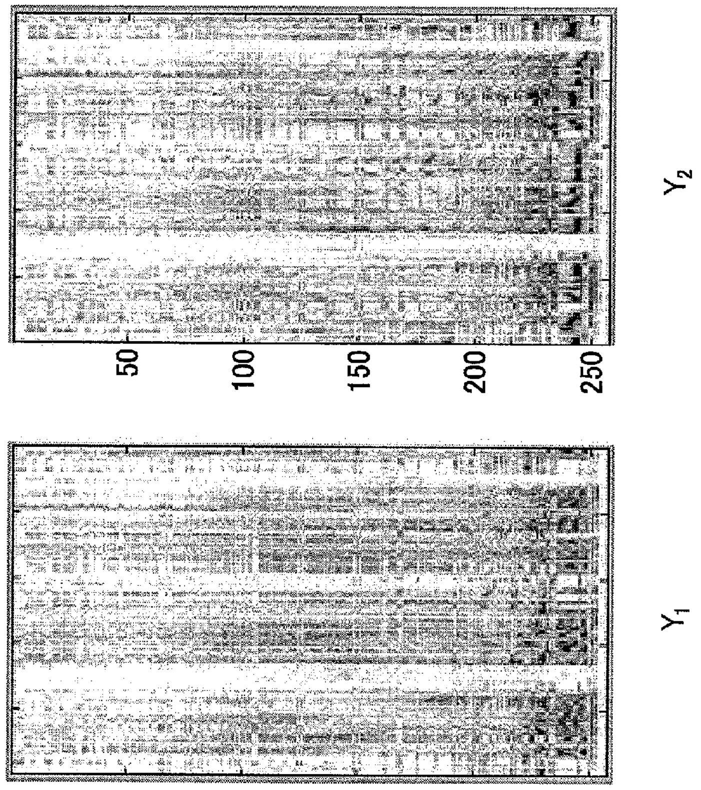
Figure 21:
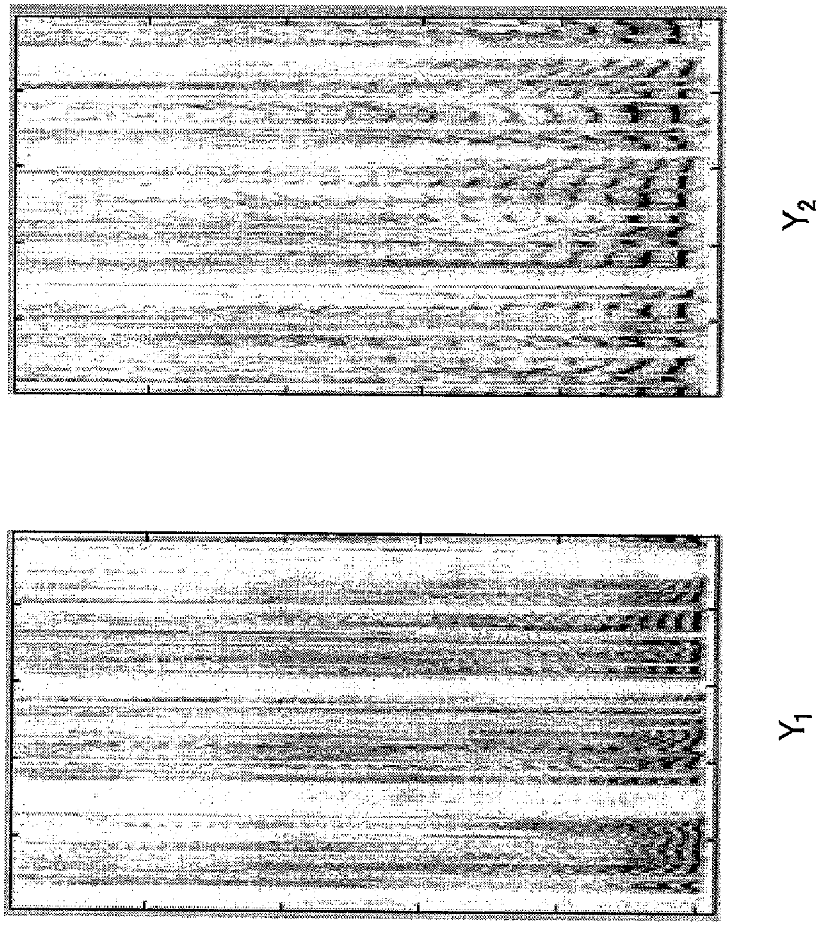
FIG. 21 shows a result of solving the permutation problem with respect to spectrograms in FIG. 20, according to the method of the present embodiment.

Permutation which was caused to take place at frequencies bin of about 33% of the spectrograms shown in FIG. 5A is shown in FIG. 20A. Frequencies bin in FIG. 20A, at which permutation takes place, are expressed by black lines in FIG. 20B. The number of frequencies bin at which permutation takes place, among total 514 (257×2) frequencies bin, is 84 in each of $Y_1$ and $Y_2$, i.e., total 168 (32.68%). Permutation problem solution processing was performed on the spectrograms shown in FIG. 20A, according to the method of the present embodiment. FIG. 21 shows a result thereof. In the spectrograms shown in FIG. 21, the number of frequencies bin at which permutation takes place is zero, so that the permutation problem has been solved perfectly.

Figure 22B:
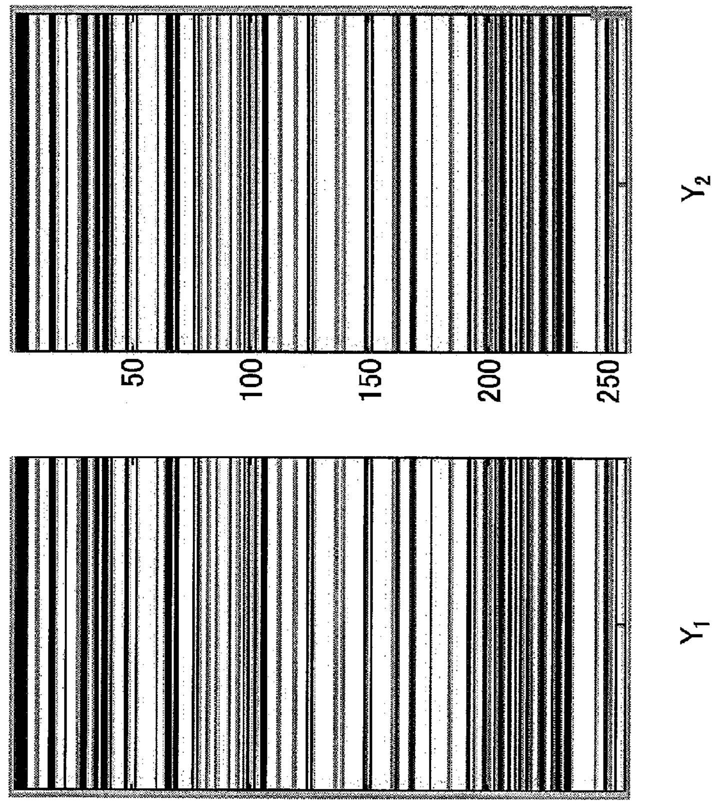
FIGS. 22A and 22B show spectrograms in case of exchanging signals at frequencies bin of about 50% where the number of channels=2 was given.
Figure 22A:
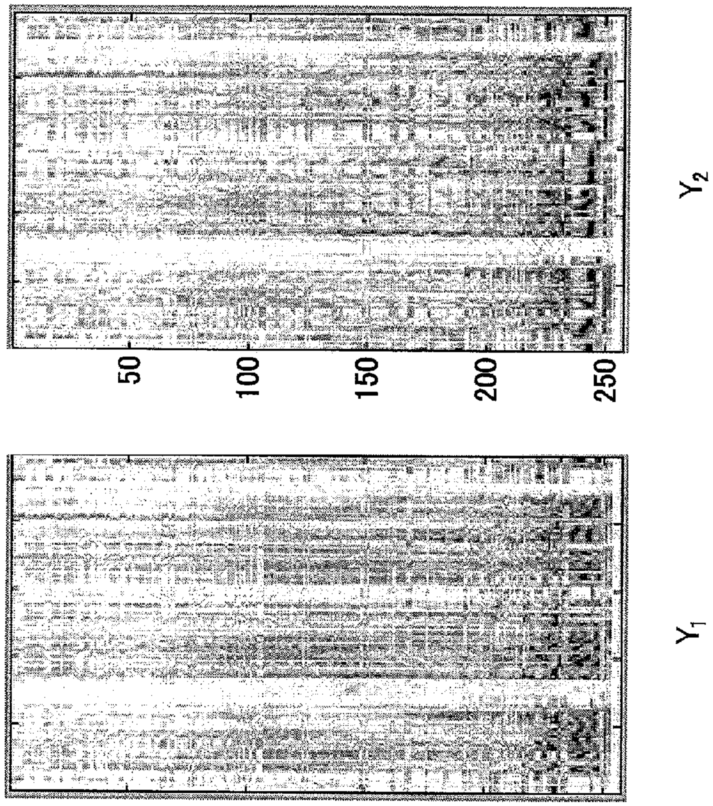
Figure 23:
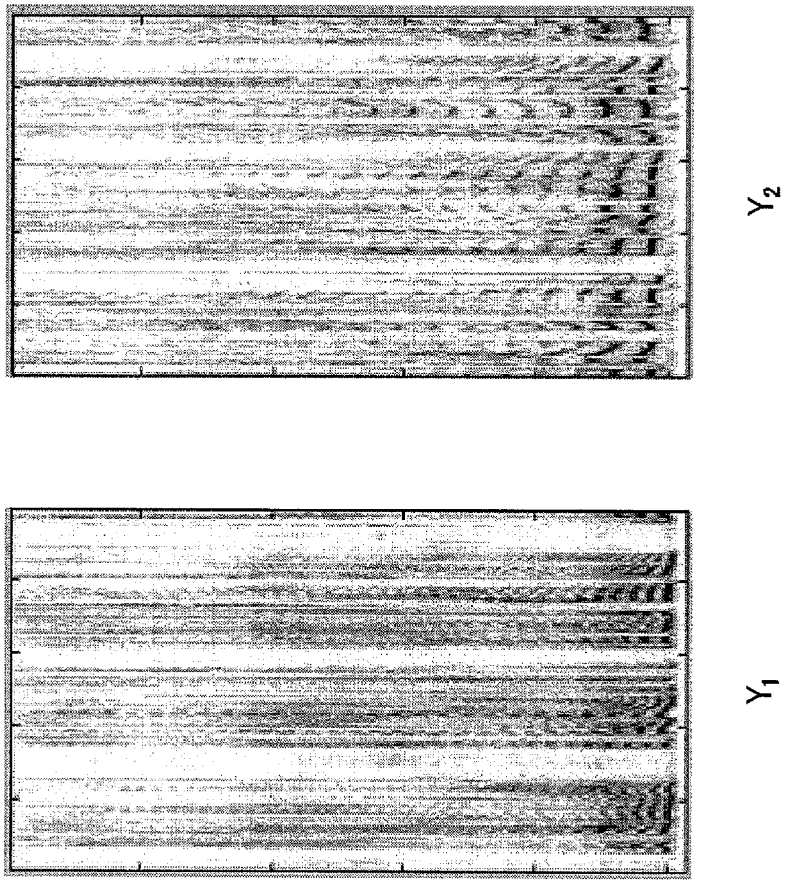
FIG. 23 shows a result of solving the permutation problem with respect to spectrograms in FIG. 22, according to the method of the present embodiment.

Similarly, permutation which was caused to take place at frequencies bin of about 50% of two spectrograms is shown in FIGS. 22A and 22B. The number of frequencies bin at which permutation takes place, among total 514 frequencies bin, is 128 in each of $Y_1$ and $Y_2$, i.e., total 256(49.81%). Permutation problem solution processing was performed on the spectrograms shown in FIG. 22A, according to the method of the present embodiment. FIG. 23 shows a result thereof. In the spectrograms shown in FIG. 23, the number of frequencies bin at which permutation takes place is zero, and thus, the permutation problem has been solved perfectly.

Next, two examples will be cited in case where the number of channels=3.

Figure 9A:
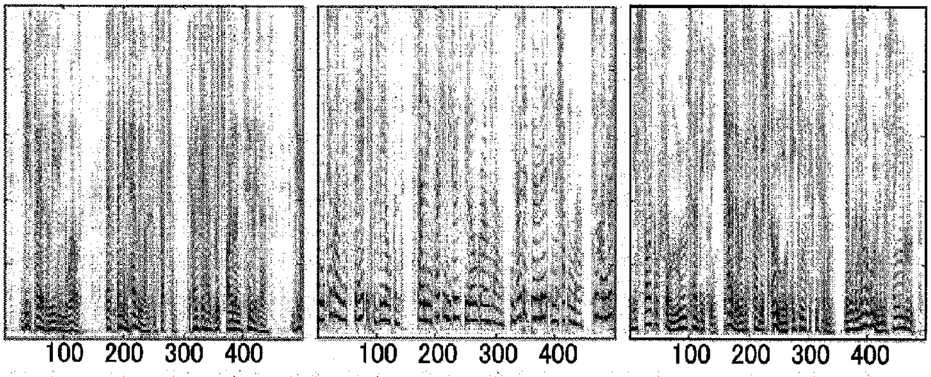
FIGS. 9A to 9D show states of spectrograms in case where signals are exchanged at frequencies bin selected at random where the number of channels=3 is given.
Figure 9B:
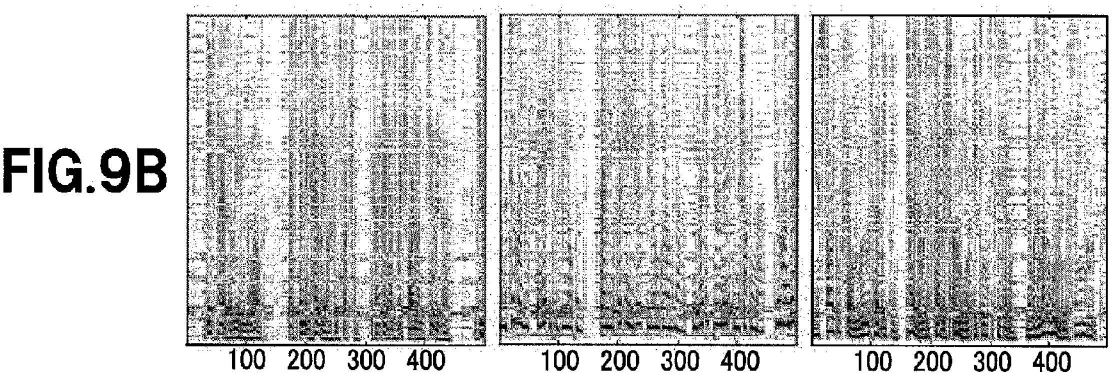
Figure 9C:
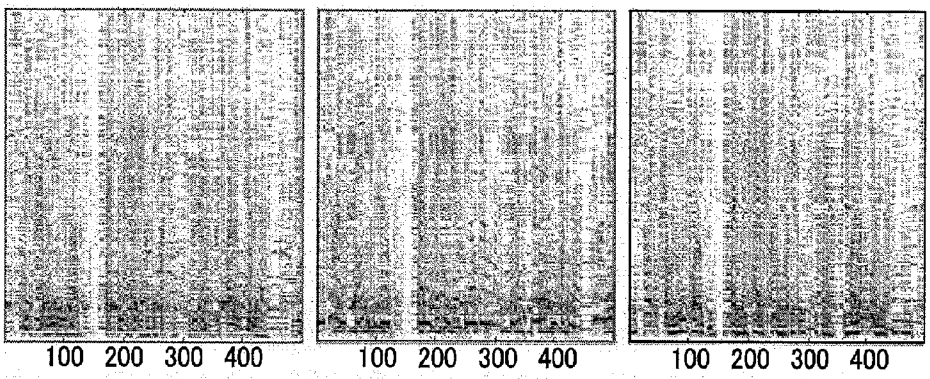
Figure 9D:
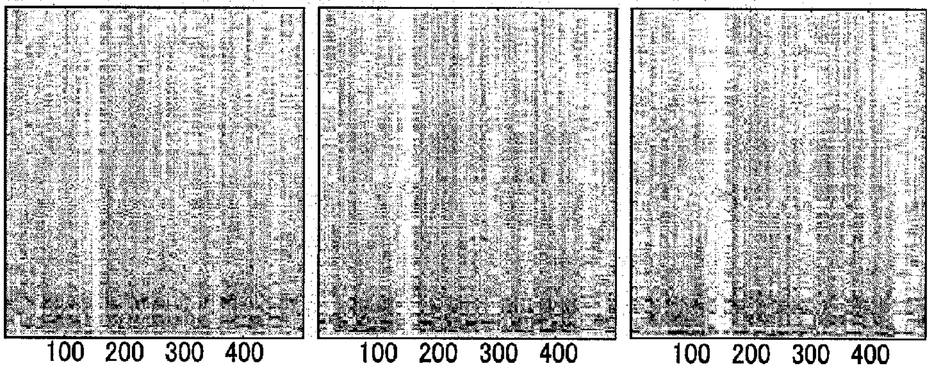
Figure 24B:
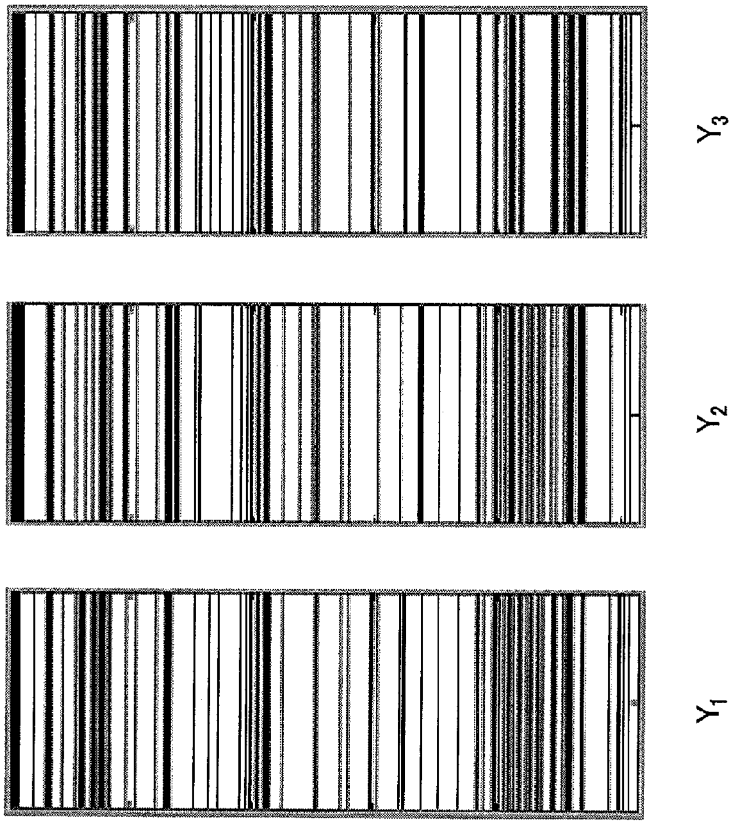
FIGS. 24A and 24B show spectrograms in case of exchanging signals at frequencies bin of about 33% where the number of channels=3 was given.
Figure 24A:
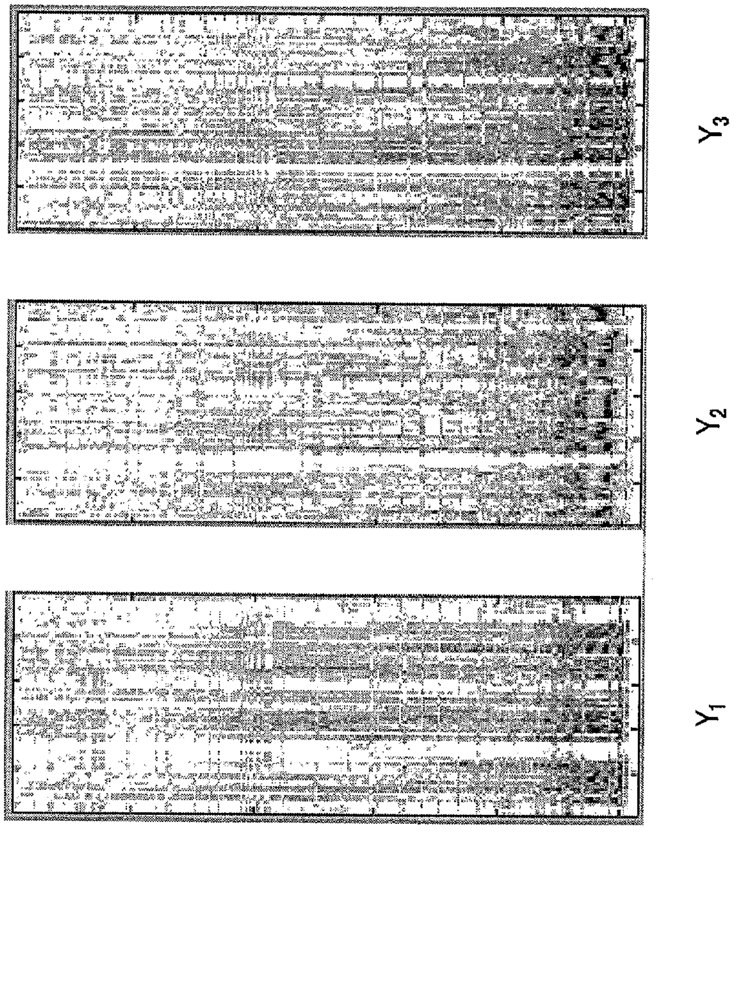
Figure 25:
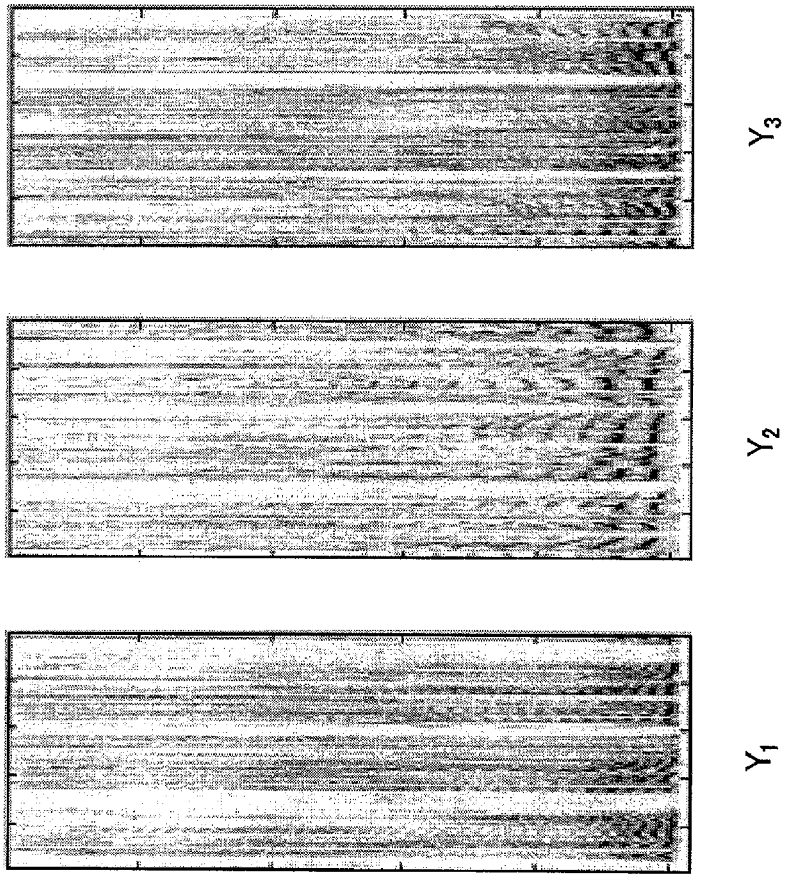
FIG. 25 shows a result of solving the permutation problem with respect to spectrograms in FIG. 24, according to the method of the present embodiment.

Permutation which was caused to take place at frequencies bin of about 33% of the spectrograms shown in FIG. 9A is shown in FIGS. 24A and 24B. The number of frequencies bin at which permutation takes place, among total 711 (257×3) frequencies bin, is 71 in $Y_1$, 72 in $Y_2$, and 71 in $Y_3$, i.e., total 214(27.76%). Permutation problem solution processing was performed on the spectrograms shown in FIG. 24A, according to the method of the present embodiment. FIG. 25 shows a result thereof. In the spectrograms shown in FIG. 25, the number of frequencies bin at which permutation takes place is zero, so that the permutation problem has been solved perfectly.

Figure 26B:
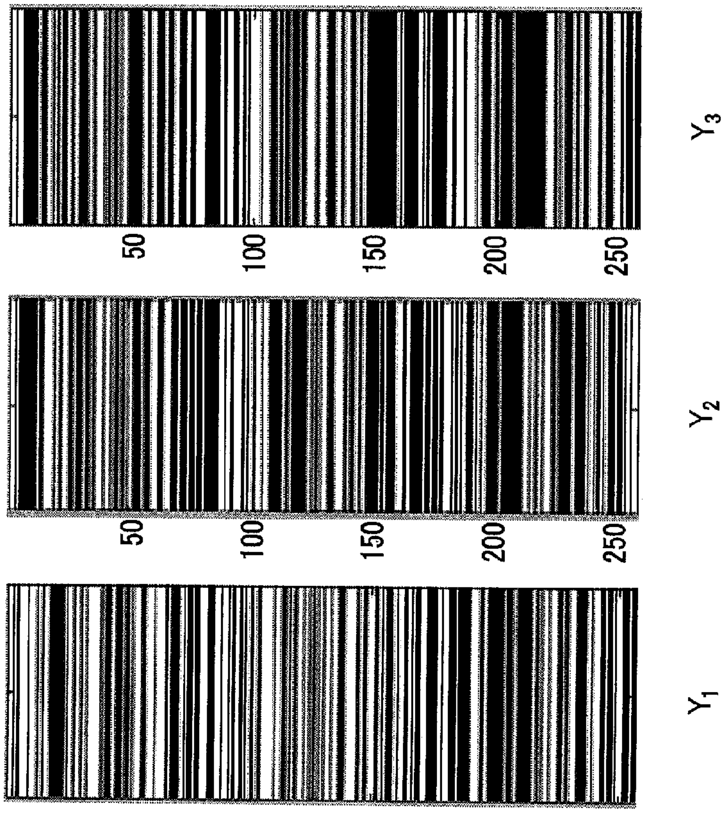
FIGS. 26A and 26B show spectrograms in case of exchanging signals at all frequencies bin where the number of channels=3 was given.
Figure 26A:
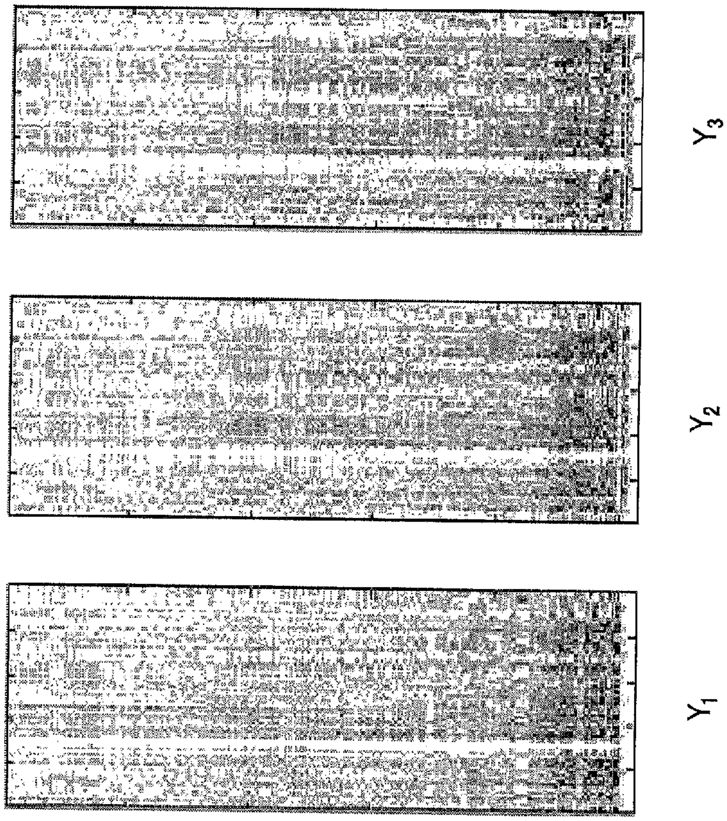
Figure 27:
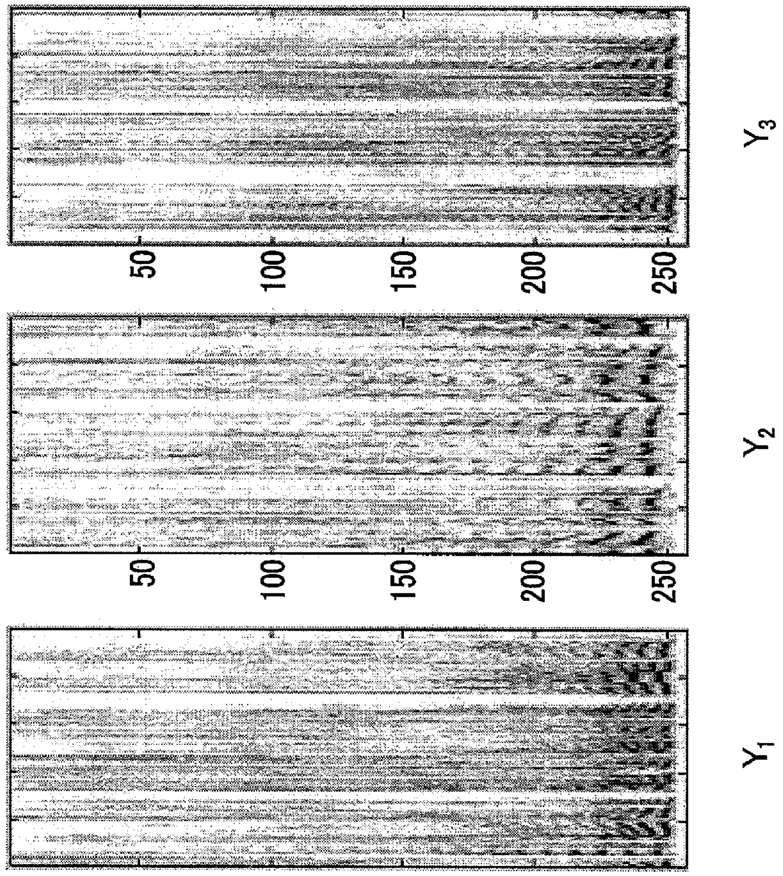
FIG. 27 shows a result of solving the permutation problem with respect to spectrograms in FIG. 26, according to the method of the present embodiment.

Similarly, permutation which was caused to take place at all frequencies bin of three spectrograms is shown in FIGS. 26A and 26B. The number of frequencies bin at which permutation takes place, among total 711 frequencies bin, is 134 in $Y_1$, 154 in $Y_2$, and 149 in $Y_3$, i.e., total 437 (56.68%). Permutation problem solution processing was performed on the spectrograms shown in FIG. 26A, according to the method of the present embodiment. FIG. 27 shows a result thereof. In the spectrograms shown in FIG. 27, the number of frequencies bin at which permutation takes place is zero, and thus, the permutation problem has been solved perfectly.

Finally, a case of the number of channels=4 will be described.

Figure 28B:
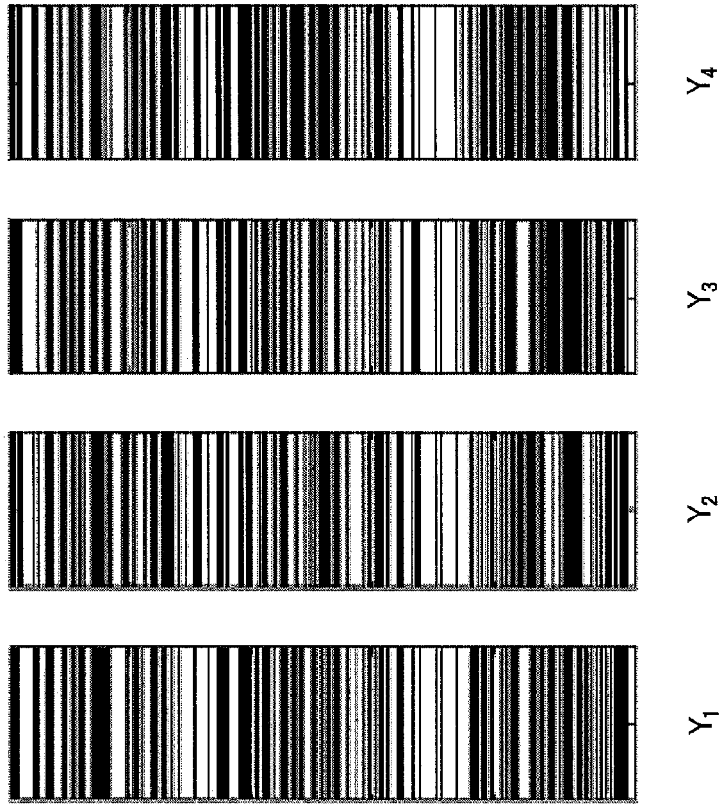
FIGS. 28A and 28B show spectrograms in case of exchanging signals at frequencies bin of about 66% where the number of channels=4 was given.
Figure 28A:
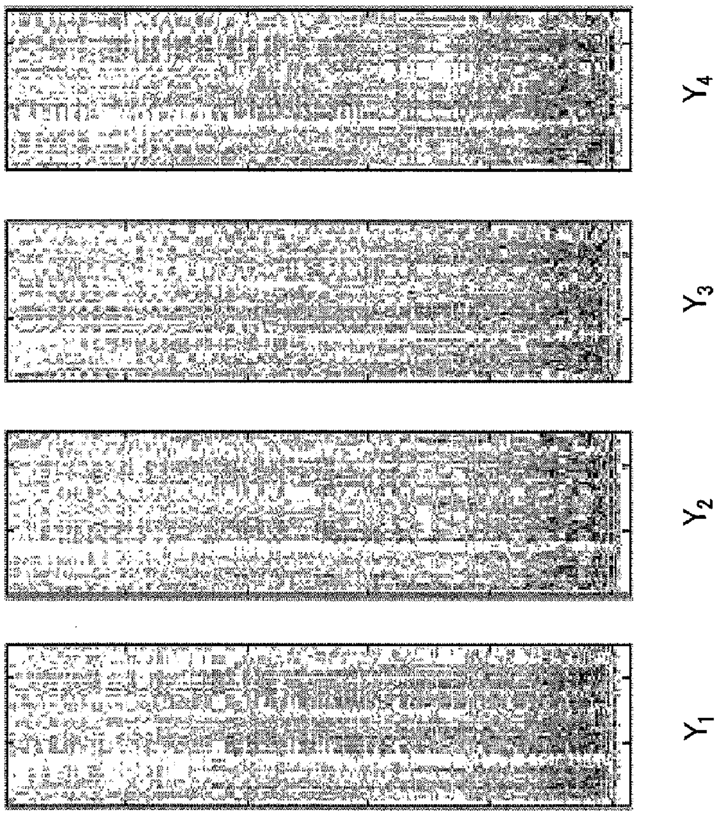
Figure 29B:
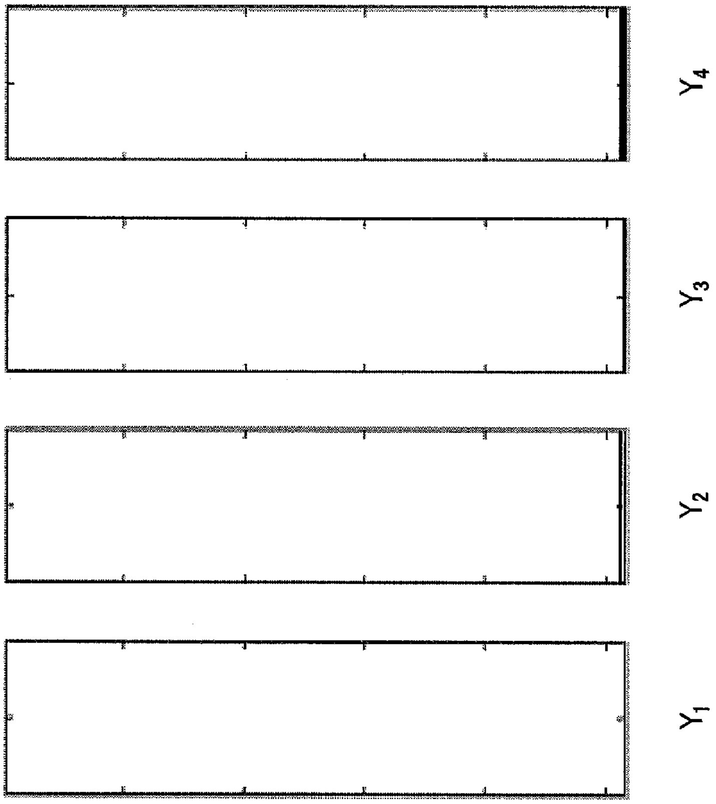
FIGS. 29A and 29B show a result of solving the permutation problem with respect to spectrograms in FIG. 28, according to the method of the present embodiment.
Figure 29A:
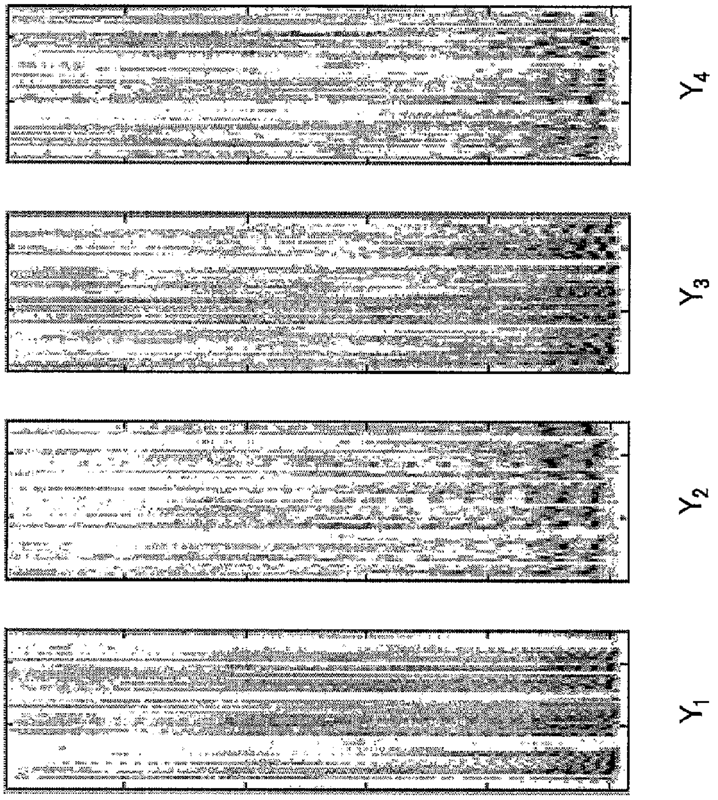

To the spectrograms shown in FIG. 9A, spectrograms obtained from a file "s4.wav" published on the same web site were added. Permutation which was caused to take place at frequencies bin of about 66% of the spectrograms is shown in FIGS. 28A and 28B. The number of frequencies bin at which permutation takes place, among total 1028 (257×4) frequencies bin, is 132 in $Y_1$, 136 in $Y_2$, 134 in $Y_3$, and 144 in $Y_4$, i.e., total 546 (53.11%). Permutation problem solution processing was performed on the spectrograms shown in FIG. 28A, according to the method of the present embodiment. FIG. 29A shows a result thereof. Frequencies bin at which permutation takes place are expressed by black lines as shown in FIG. 29B. In the spectrograms shown in FIG. 29A, the number of frequencies bin at which permutation takes place is 1 in $Y_2$, 1 in $Y_3$, and 2 in $Y_4$, i.e., total four (0.39%). Thus, the permutation problem has been solved greatly.

Figure 30B:
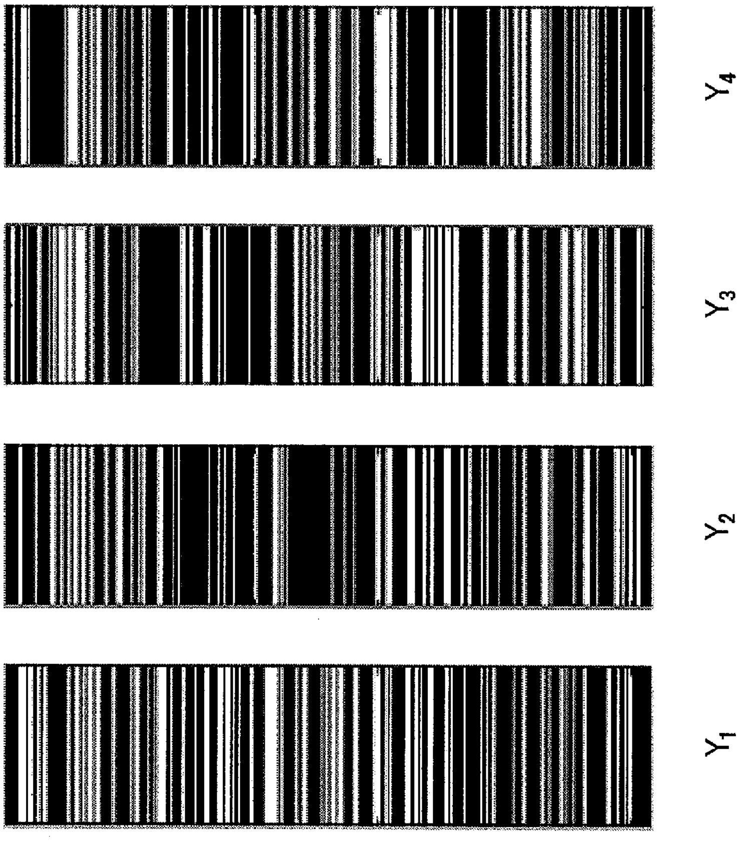
FIGS. 30A and 30B show spectrograms in case of exchanging signals at all frequencies bin where the number of channels=4 was given.
Figure 30A:
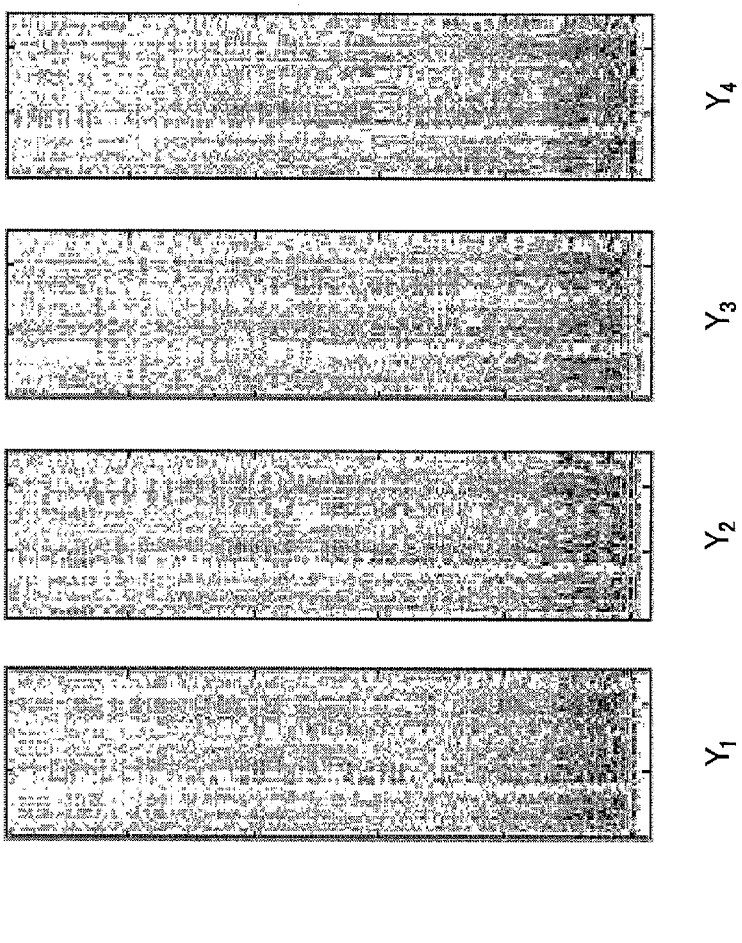
Figure 31B:
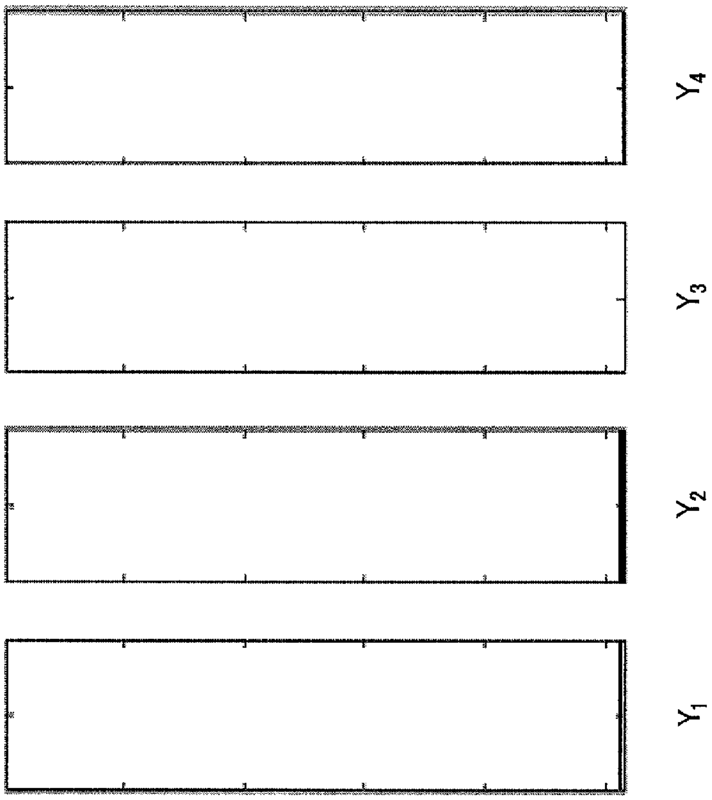
FIGS. 31A and 31B show a result of solving the permutation problem with respect to spectrograms in FIG. 30, according to the method of the present embodiment.
Figure 31A:
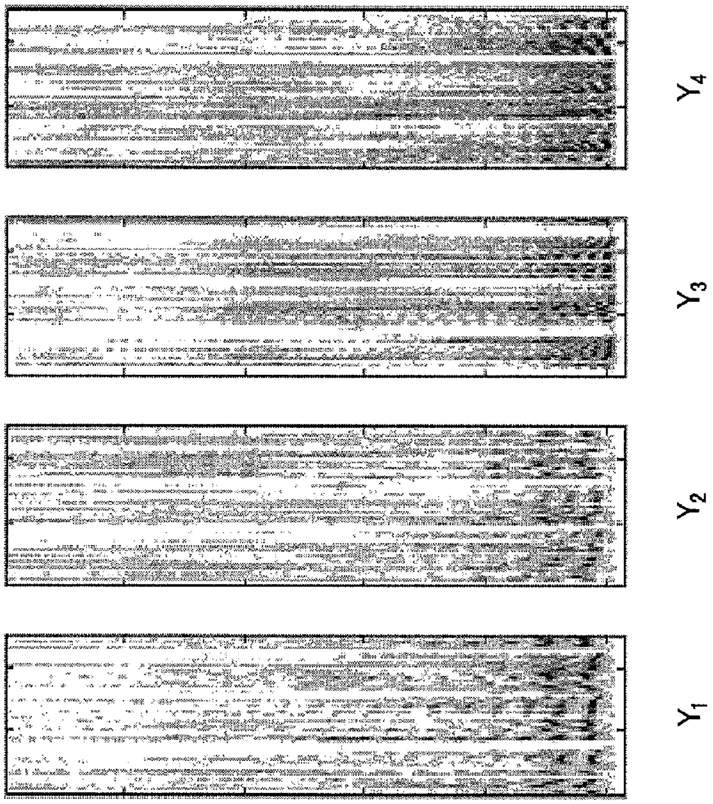

Similarly, permutation which was caused to take place at all frequencies bin of four spectrograms is shown in FIGS. 30A and 30B. The number of frequencies bin at which permutation takes place, among total 1028 frequencies bin, is 171 in $Y_1$, 187 in $Y_2$, 177 in $Y_3$, and 178 in $Y_4$, i.e., total 713 (69.36%). Permutation problem solution processing was performed on the spectrograms shown in FIG. 30A, according to the method of the present embodiment. FIGS. 31A and 31B show a result thereof. In the spectrograms shown in FIG. 30A, the number of frequencies bin at which permutation takes place is 1 in $Y_1$, 2 in $Y_2$, and 1 in $Y_4$, i.e., total 4 (0.39%). Thus, the permutation problem has been solved greatly.

As has been described above, according to the audio signal separation device 1 in the present embodiment, each one of plural signals mixed up in an audio signal can be separated from the audio signal by use of independent component analysis. In addition, the KL information amount calculated by use of a multidimensional probability density function or multidimensional kurtosis can be used as a scale to measure the degree of permutation. The problem of permutation between separate signals can be solved with high accuracy without using information concerning characteristics of original signals, positions of microphones, or the like.

(First Modification)

Figure 17:
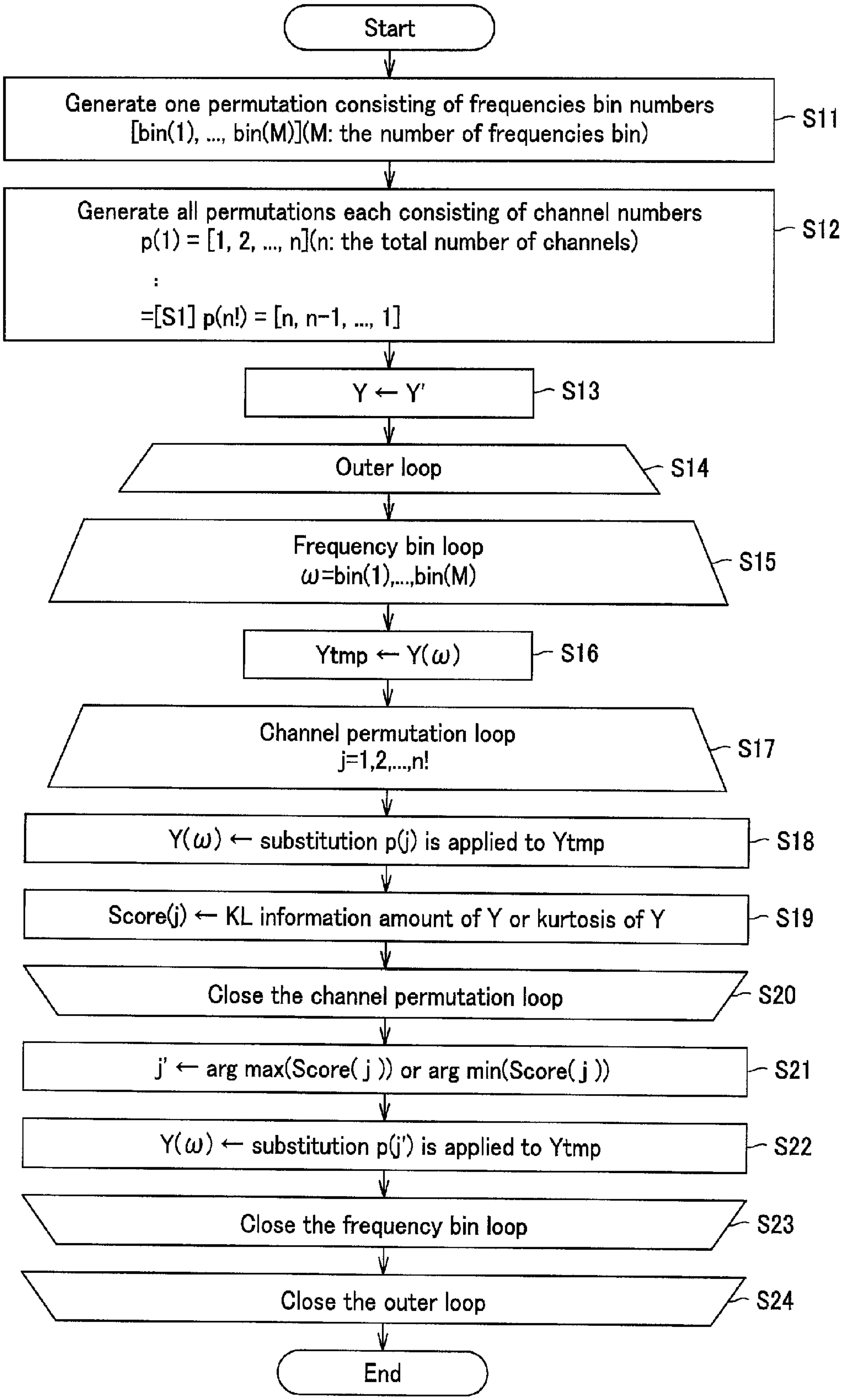
FIG. 17 is a flowchart explaining specifically an example of permutation problem solution processing.
Figure 32:
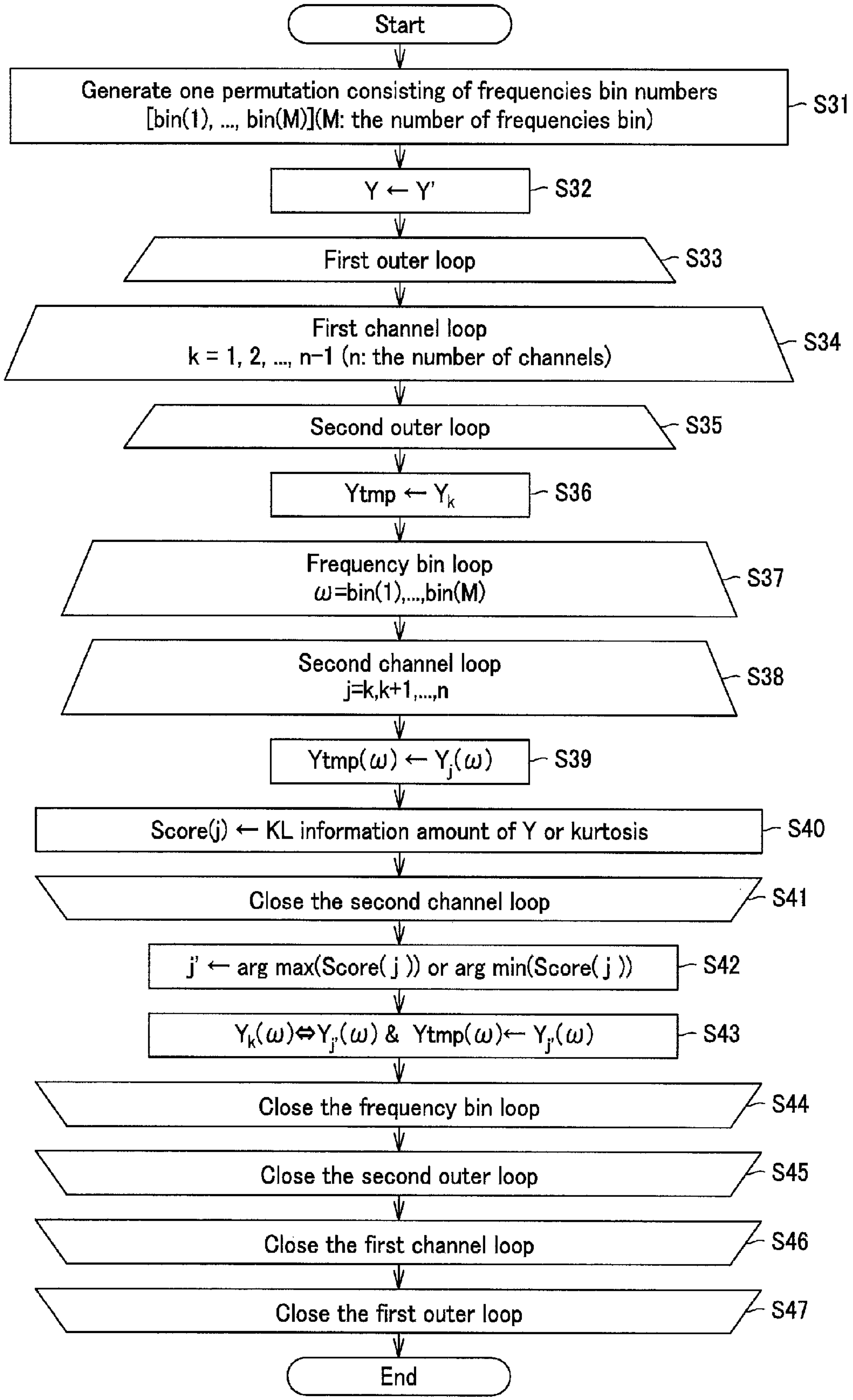
FIG. 32 is a flowchart explaining specifically another example of permutation problem solution processing.

In the permutation problem solution processing of which algorithm is shown in FIG. 17, a calculation amount of the order of n!M is necessary. Therefore, the processing time elongates as the channel number n increases. Hence, the calculation amount can be limited to the order of $n^2M$ by determining the method of exchanging signals at the frequency bin, for each channel, as described below. Details of the permutation problem solution processing will now be described with reference to FIG. 32.

At first in step S31, a permutation [bin(1), . . . bin(M)] including numbers of frequencies bin is generated. In step S32, Y is substituted with Y'. Y is a parameter to store spectrograms after exchanging signals at a frequency bin. Y' indicates a spectrogram in which permutation takes place immediately after separation.

Steps S33 to S47 constitute a first outer loop. This loop is repeated to increase the degree of solution of permutation problem. Steps S34 to S46 constitute a first channel loop. In steps S35 to S45, a method of exchanging signals at a frequency bin with respect to a spectrogram of the k-th channel is determined. If methods of exchanging signals at a frequency bin are determined with respect to n−1 channels, a method of exchanging signals with respect to the remaining one channel is automatically determined. Therefore, the loop has only to deal with channels 1 to (n−1).

Steps S35 to S45 constitute a second outer loop. This loop is also repeated to increase the degree of solution of permutation problem. In steps S36 to S44, a method of exchanging signals at a frequency bin with respect to a spectrogram of the k-th channel is determined. For this purpose, the parameter to store a processing result is set to $Y_{tmp}$, and $Y_k$ is substituted as an initial value. Steps S37 to S44 constitute a loop with respect to the frequency bin. In this loop, a frequency bin is selected according to the permutation [bin(1), . . . bin(M)] (generated in step S31, and signals at the selected ω-th frequency bin are exchanged with signals of another channel j (j=k, k+1,. . . n), thereby to find out a method of exchanging signals, which maximizes or minimizes entropy $H(Y_k)$ of the channel k or maximizes kurtosis (hereinafter referred to as "optimizes entropy or kurtosis"). With respect to channels 1 to (K−1), the permutation problem has already been solved, and therefore, signals at the frequency bin do not have to be exchanged.

Steps S38 to S41 constitute a second channel loop. In this loop, the signal of the channel j at a frequency bin where the channel j is selected in the order from k to n is exchanged with the signal of the channel k at the frequency bin. Entropy or kurtosis after exchange is calculated. More specifically, in step S39, the signal $Y_j(\omega)$ of the channel j at the ω-th frequency bin and the signal $Y_{tmp}(\omega)$ of $Y_{tmp}$ at the ω-th frequency bin are exchanged with each other. In step S40, entropy or kurtosis of $Y_{tmp}$ is substituted into Score(j). Score (j) is obtained for each of channels k to n. Then, in step S42, an index corresponding to the maximum or minimum value of the obtained Score is obtained. Where the obtained index is j', exchange corresponding to j' can be, with high possibility, the exchange method which solves the permutation problem at the ω-th frequency bin. Hence, in step S43, the signal $Y_k(\omega)$ of the channel k at the ω-th frequency bin and the signal $Y_{j'}(\omega)$ of the channel j' at the ω-th frequency bin are exchanged with each other, and the signal $Y_{j'}(\omega)$ of the channel j' at the ω-th frequency bin is substituted into the signal $Y_{tmp}(\omega)$ of $Y_{tmp}$ at the ω-th frequency bin. If this processing of steps S38 to S43 is performed on all frequencies bin, the entropy or kurtosis of the channel k is optimized, and the permutation problem is solved. If this processing is further performed on all channels, the permutation problem is solved on all channels.

(Second Modification)

Figure 33:
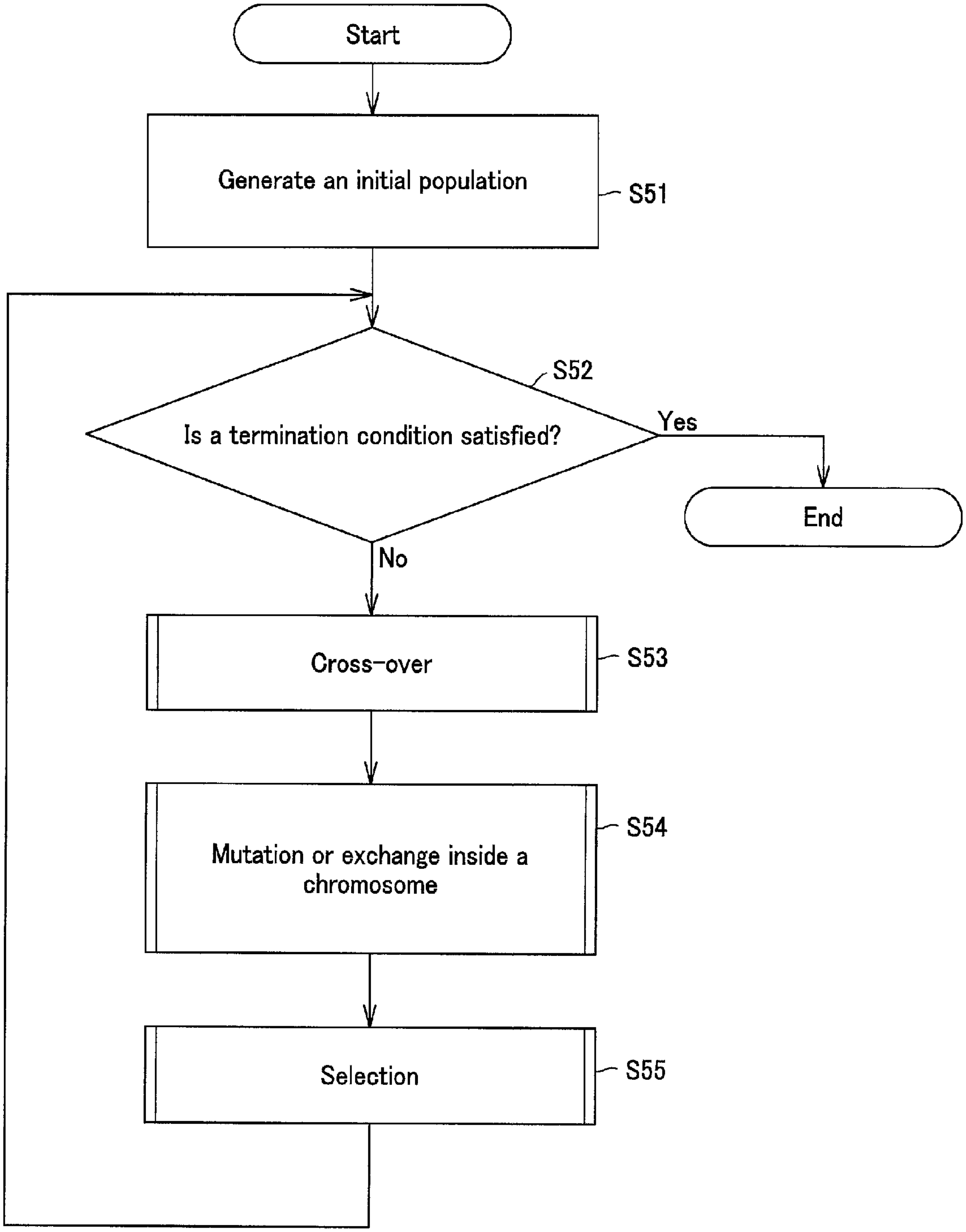
FIG. 33 is a flowchart explaining specifically an example of permutation problem solution processing using a genetic algorithm.

As has been described above, in the permutation problem solution processing of which algorithm is shown in FIG. 17, a calculation amount of the order of n!M is necessary. Therefore, the processing time elongates as the channel number n increases. Hence, the calculation amount can be reduced by using a genetic algorithm as described below. In this method, a substitutive row ([1, 3, 2] or the like) is used as a gene, as well as a row including substitutive rows as a chromosome. The KL information amount calculated by use of a multidimensional probability density function or multidimensional kurtosis is used as a scale to measure superiority of each chromosome. Details of this permutation problem solution processing will be described with reference to FIG. 33.

Figure 34:
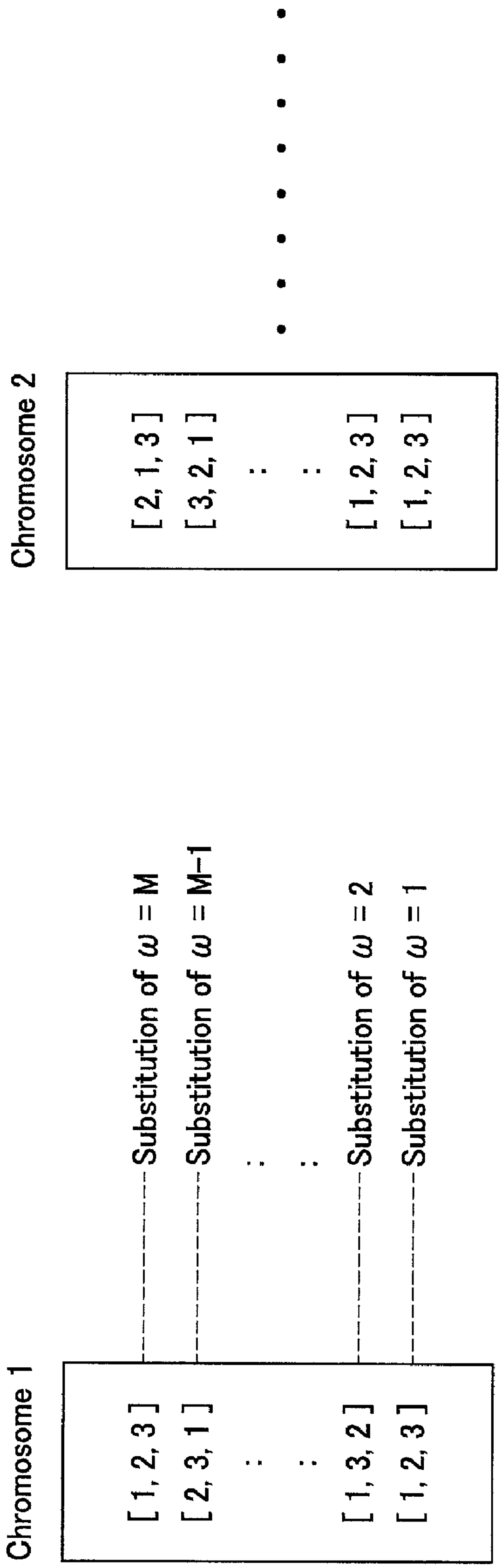
FIG. 34 shows examples of chromosomes according to the genetic algorithm.

At first in step S51, an arbitrary number of chromosomes each including substitutive rows generated at random are generated as an initial population. The form of the chromosome is shown in FIG. 34. Thus, substitutive rows each for each frequency bin, which are arranged vertically and correspond in number to frequencies bin, are used as chromosomes.

In next step S52, whether a termination condition is satisfied or not is determined. The termination condition may be a predetermined number of repetitions of the processing of steps S53 to S55 or convergence of the population, i.e., an optimum solution which stays intact. If the termination condition is not satisfied, the processing goes to step S53.

Figure 35A:
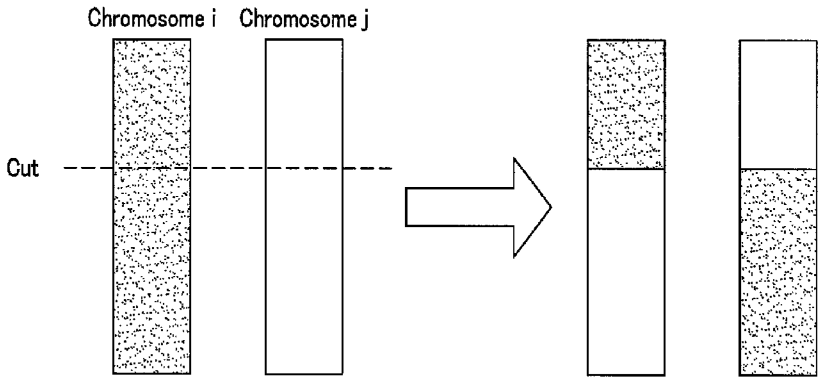
FIGS. 35A to 35C show examples of cross-over according to the genetic algorithm.
Figure 35B:
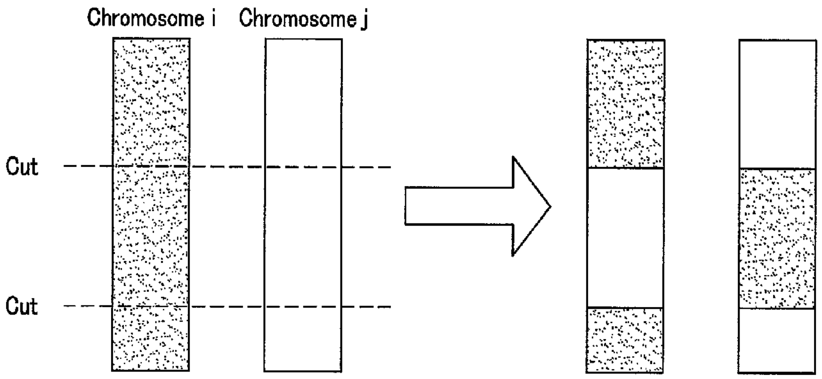
Figure 35C:
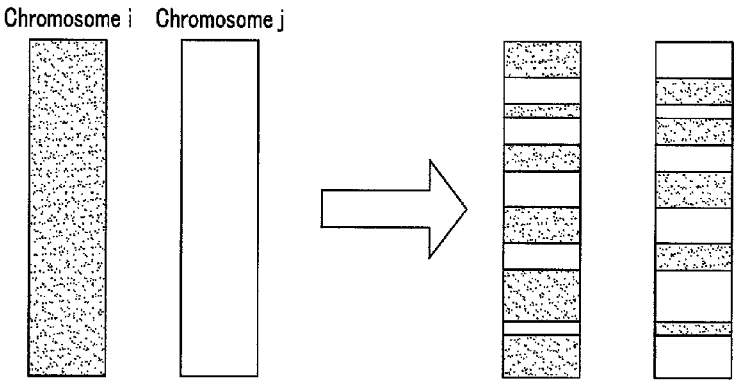

In subsequent step S53, crossing-over is applied to the population. The crossing-over is to select two or more chromosomes from the population and to exchange genes (substitutive rows) between the chromosomes. This crossing-over is repeated an arbitrary number of times. The crossing-over includes variations such as one-point crossing-over as shown in FIG. 35A, two-point crossing-over as shown in FIG. 35B, and multi-point crossing-over shown in FIG. 35C. Any of the variations may be used. Alternatively, ω may be selected at random, and ω-th substitutive rows may be exchanged. In place of selecting ω at random, ω may be determined according to the same reference as in step S11 in FIG. 17.

Figure 36:
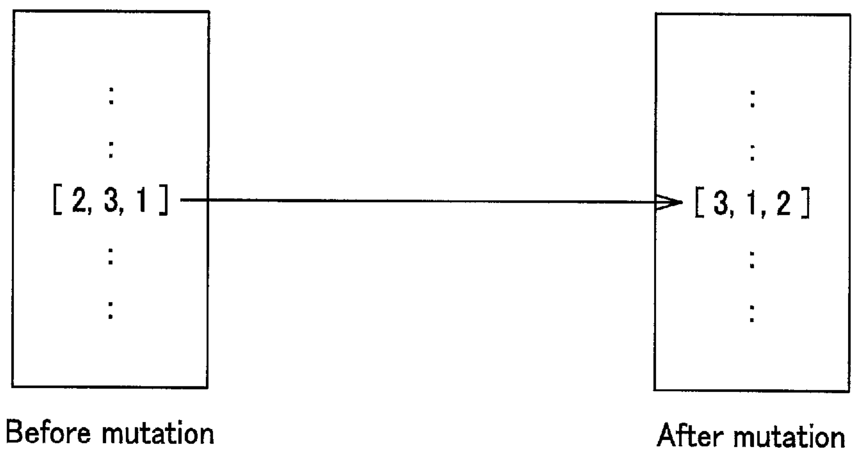
FIG. 36 shows an example of mutation according to the genetic algorithm.
Figure 37:
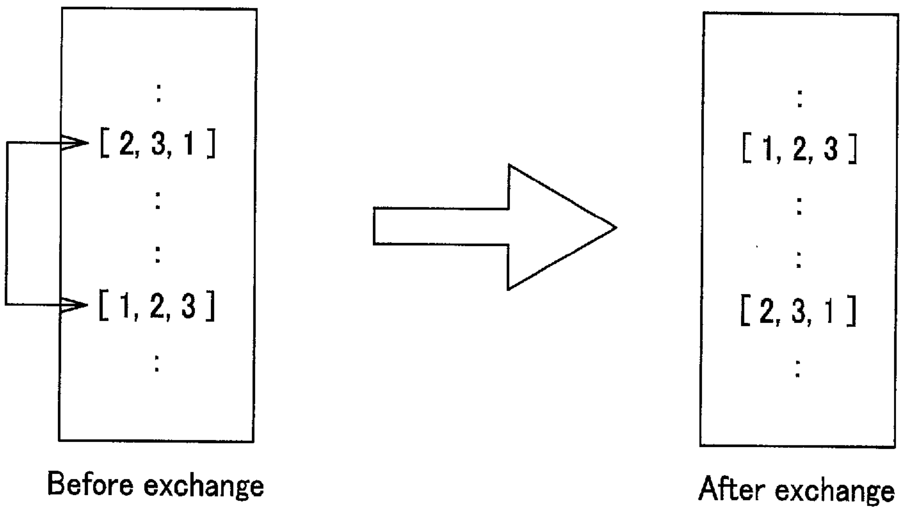
FIG. 37 shows an example of exchange inside a chromosome according to the genetic algorithm.

In subsequent step S54, mutation or exchange inside a chromosome is applied to a new chromosome or previous chromosomes, based on a certain probability. The mutation is that one chromosome is extracted arbitrarily and a gene (substitutive row) at an arbitrary position is replaced with another chromosome, as shown in FIG. 36. On the other side, exchange inside a chromosome is that substitutive rows are exchanged with one another inside one gene, as shown in FIG. 37. By thus applying mutation or exchange inside a chromosome, even such a chromosome that is not capable of being generated by only the crossing-over can be generated.

In subsequent step S55, selection is made from chromosomes thus generated, to determine population for the next generation. Details of this selection processing will be described later. The processing returns to step S52 after completion of the selection processing. The processing of steps S53 to S55 is repeated until the termination condition is satisfied.

Figure 38:
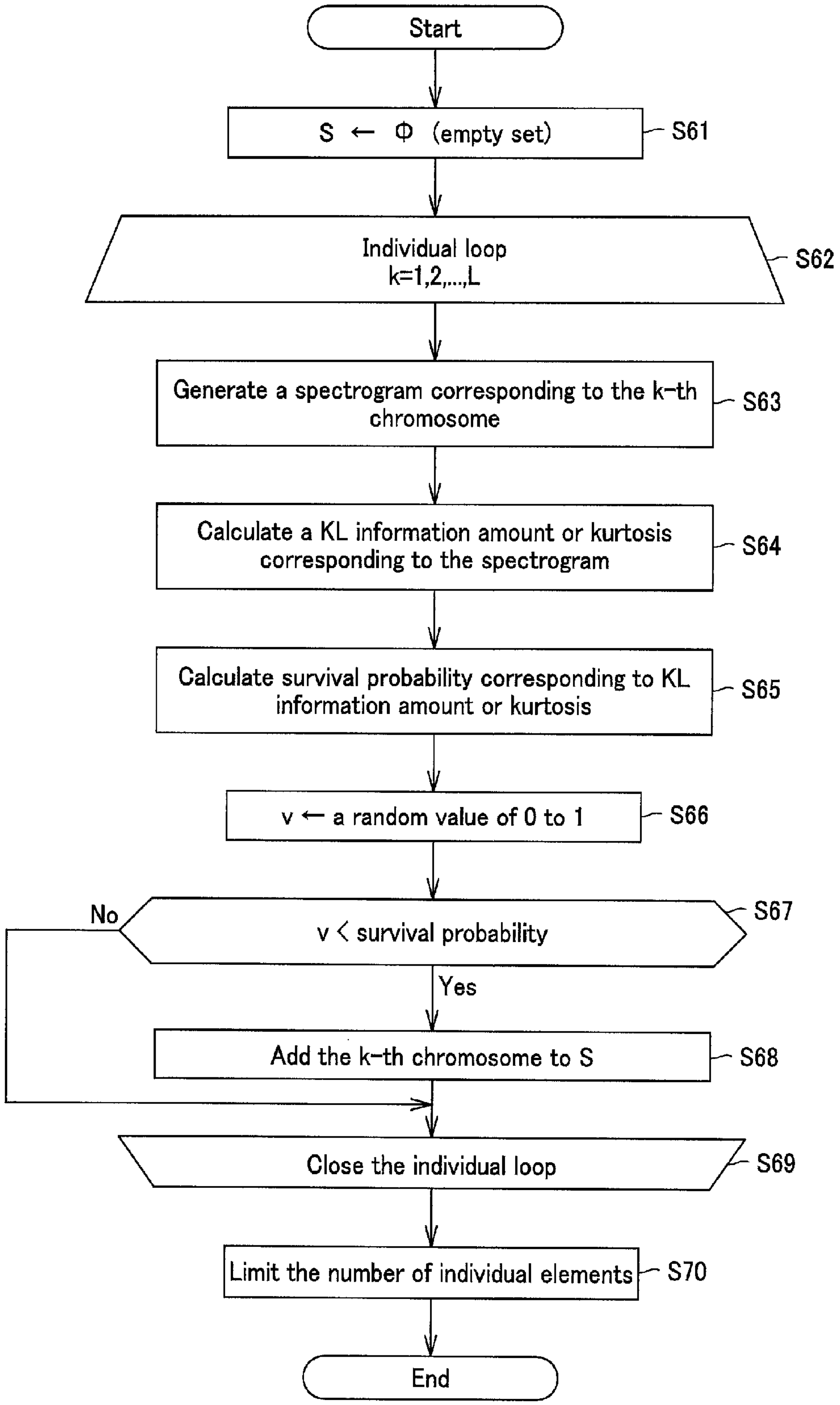
FIG. 38 is a flowchart explaining specifically an example of selection operation.

Details of the selection processing in step S55 described above will now be described with reference to the flowchart of FIG. 38.

At first in step S61, a parameter S is taken as a set of individual elements (chromosomes) to remain in the next generation. An empty set is substituted as an initial value.

Steps S62 to S69 constitute a loop with respect to individual elements. In this loop, the processing of steps S63 to S68 is performed on each of new chromosomes (and previous chromosomes if necessary) generated by operation such as crossing-over, mutation, or exchange inside a chromosome.

In step S63, a spectrogram corresponding to a k-th chromosome is obtained. That is, an exchange method expressed by the k-th chromosome is applied to each of frequencies bin of a spectrogram Y' after separation processing, to generate a new spectrogram. In step S64, a KL information amount and kurtosis are calculated with respect to the generated spectrogram.

Figure 39A:
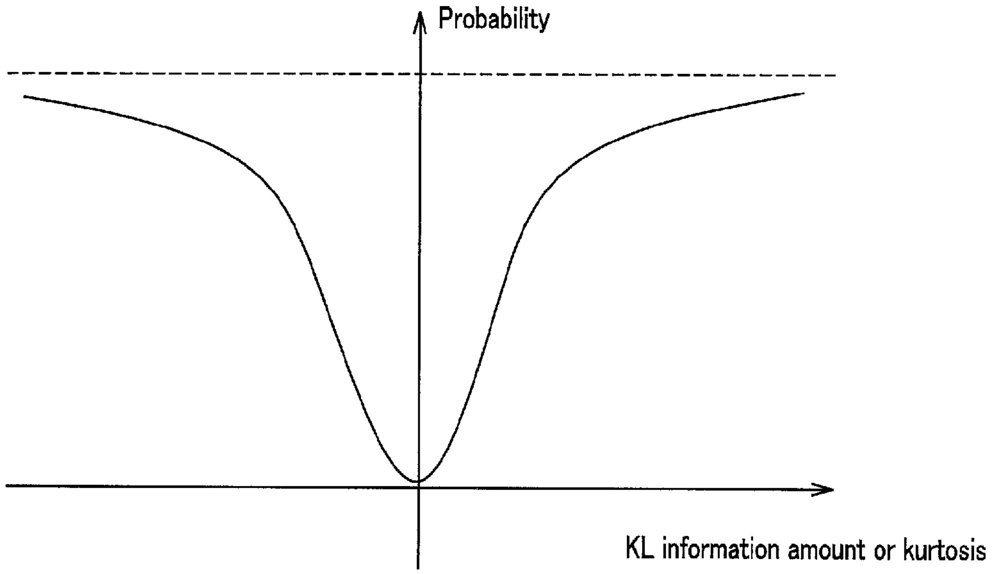
FIGS. 39A and 39B are graphs showing examples of survival probability functions used in the selection operation.
Figure 39B:
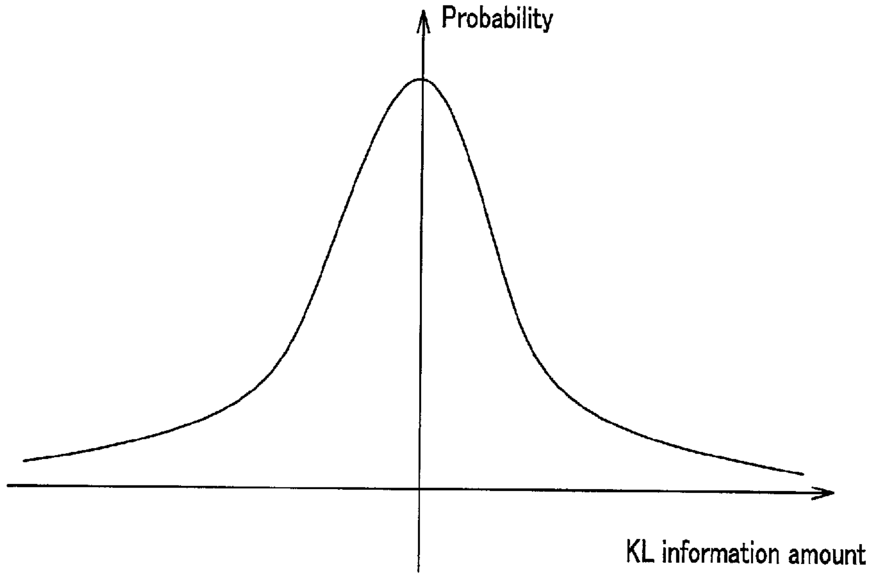

In subsequent step S65, survival probability of the individual element is calculated in accordance with the value of the KL information amount or kurtosis. In case of using kurtosis, the degree of permutation decreases as the value of kurtosis increases. Therefore, the survival probability is calculated by use of a concave function as shown in FIG. 39A so that the survival probability increases as the value increases. Otherwise, in case of using the KL information amount, a function as shown in FIG. 39A is used to calculate the survival probability, with respect to the probability density function expressed by the symbol "∪" in the table 1 described previously. With respect to the probability density function expressed by the symbol "∩" in the table 1,a function as shown in FIG. 39B is used to calculate the survival probability.

After calculating the survival probability, whether each of genes should remain or not is determined based on the value of the survival probability, in steps S66 to S68. More specifically, in step S66, a value between 0 and 1 is generated as a random number. In step S67, whether the value of the survival probability is greater than the value of the random number or not is determined. If the value of the survival probability is not greater than the value of the random number, the corresponding individual element is erased. Otherwise, if the value of the survival probability is greater than the value of the random number, the corresponding individual element is let remain in the next generation. Accordingly in step S68, the individual element is added to the set S.

The processing of steps S63 to S68 is performed on each individual element, to generate individual elements for the next generation. Thereafter in step S70, the number of individual elements is limited. That is, only upper L individual elements in the order from the greatest survival probability remain.

An embodiment of the present invention has been described above. However, the present invention is not limited to the above embodiment but may be variously modified without deviating from the scope of the subject matter of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal separation device which generates separate signals by separating each one of plural signals mixed up in plural channels of observation signals in time domain from the observation signals by use of independent component analysis, the audio signal separation device comprising:

transformation means for transforming the observation signals in time domain into frequency domain, to generate a spectrogram of the observation signals;

separation means for generating spectrograms of the separate signals from the spectrograms of the observation signals; and permutation problem solution means for solving a permutation problem in the spectrograms of the separate signals, wherein the permutation problem solution means calculates a scale corresponding to a degree of permutation from the spectrograms of the separate signals, and exchanges signals at each of frequencies bin of the spectrograms of the separate signals between channels according to the calculated scale by using the plurality of frequency bins for each spectrogram to solve the permutation problem.

2. The audio signal separation device according to claim 1, wherein the scale corresponding to the degree of permutation is a Kullback-Leiblar information amount calculated by use of a multidimensional probability density function or multidimensional kurtosis.

3. The audio signal separation device according to claim 2, wherein the multidimensional probability density function is based on an L-N norm or elliptical distribution.

4. An audio signal separation method for generating separate signals by separating each one of plural signals mixed up in plural channels of observation signals in time domain from the observation signals by use of independent component analysis, the audio signal separation method comprising:

a transformation step of transforming the observation signals in time domain into frequency domain, to generate a spectrograms of the observation signals;

a separation step of generating spectrograms of the separate signals from the spectrograms of the observation signals; and a permutation problem solution step of solving a permutation problem in the spectrograms of the separate signals, wherein in the permutation problem solution step, a scale corresponding to a degree of permutation is calculated from the spectrograms of the separate signals by using the plurality of frequency bins for each spectrogram and signals at each frequency bin of the spectrograms of the separate signals are exchanged between channels according to the calculated scale, to solve the permutation problem.

5. An audio signal separation device which generates separate signals by separating each one of plural signals mixed up in plural channels of observation signals in time domain from the observation signals by use of independent component analysis, the audio signal separation device comprising:

a transformation section that transforms the observation signals in time domain into frequency domain, to generate a spectrograms of the observation signals;

a separation section that generates spectrograms of the separate signals from the spectrograms of the observation signals; and a permutation problem solution section that solves a permutation problem in the spectrograms of the separate signals, wherein the permutation problem solution section calculates a scale corresponding to a degree of permutation from the spectrograms of the separate signals by using the plurality of frequency bins for each spectrogram and exchanges signals at each frequency bin of the spectrograms of the separate signals between channels according to the calculated scale, to solve the permutation problem.

* * * * *